United States Patent
Kusashima et al.

(10) Patent No.: US 11,985,640 B2
(45) Date of Patent: May 14, 2024

(54) TERMINAL DEVICE, BASE STATION DEVICE, AND METHOD

(71) Applicant: SONY GROUP CORPORATION, Tokyo (JP)

(72) Inventors: Naoki Kusashima, Kanagawa (JP); Hiromasa Uchiyama, Tokyo (JP); Hiroki Matsuda, Tokyo (JP); Yifu Tang, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/323,315

(22) Filed: May 24, 2023

(65) Prior Publication Data

US 2023/0300809 A1    Sep. 21, 2023

Related U.S. Application Data

(63) Continuation of application No. 16/959,749, filed as application No. PCT/JP2018/040170 on Oct. 29, 2018, now Pat. No. 11,700,595.

(30) Foreign Application Priority Data

Jan. 11, 2018  (JP) ................. 2018-002388

(51) Int. Cl.
*H04W 72/04* (2023.01)
*H04L 5/00* (2006.01)
*H04W 72/0446* (2023.01)
*H04W 72/21* (2023.01)
*H04W 74/02* (2009.01)

(52) U.S. Cl.
CPC ....... *H04W 72/0446* (2013.01); *H04L 5/0037* (2013.01); *H04W 72/21* (2023.01); *H04W 74/02* (2013.01)

(58) Field of Classification Search
CPC . H04W 74/02; H04W 74/0808; H04W 72/20; H04W 72/0446
See application file for complete search history.

(56) References Cited

U.S. PATENT DOCUMENTS

| | | |
|---|---|---|
| 2009/0323640 A1 | 12/2009 | Chakrabarti et al. |
| 2013/0329711 A1 | 12/2013 | Seo |
| 2017/0164345 A1 | 6/2017 | Goto |
| 2017/0331577 A1 | 11/2017 | Parkvall |
| 2017/0373914 A1 | 12/2017 | Harada |

(Continued)

FOREIGN PATENT DOCUMENTS

| | | |
|---|---|---|
| CA | 3017311 A1 | 10/2017 |
| CN | 102067696 A | 5/2011 |
| EP | 2301295 A2 | 3/2011 |

(Continued)

OTHER PUBLICATIONS

Office Action for IN Patent Application No. 202017028362, dated Apr. 18, 2022, 06 pages of Office Action.

(Continued)

*Primary Examiner* — Bo Hui A Zhu
(74) *Attorney, Agent, or Firm* — CHIP LAW GROUP

(57) ABSTRACT

A terminal device including a control unit that transmits first resource information, which indicates a radio resource available to another communication device among radio resources of which access rights are acquired by performing carrier sense, on an uplink or a sidelink.

15 Claims, 15 Drawing Sheets

(56) References Cited

U.S. PATENT DOCUMENTS

2019/0014595 A1   1/2019   Yu et al.
2020/0228995 A1   7/2020   Yang et al.

FOREIGN PATENT DOCUMENTS

| JP | 2011-526130 A | 9/2011 |
| JP | 2017-184201 A | 10/2017 |
| JP | 2017-224949 A | 12/2017 |
| KR | 10-2011-0039292 A | 4/2011 |
| WO | 2009/158050 A2 | 12/2009 |
| WO | 2017/171026 A1 | 10/2017 |

OTHER PUBLICATIONS

"Revised SID on NR-based Access to Unlicensed Spectrum", Qualcomm Incorporated, 3GPP TSG RAN, 77th Meeting, RP-172021, Sapporo, Japan, Sep. 11-14, 2017, 05 pages.

International Search Report and Written Opinion of PCT Application No. PCT/JP2018/040170, dated Jan. 15, 2019, 07 pages of English Translation and 07 pages of ISRWO.

International Preliminary Report on Patentability of PCT Application No. PCT/JP2018/040170, dated Jul. 23, 2020, 08 pages of English Translation and 05 pages of IPRP.

Non-Final Office Action for U.S. Appl. No. 16/959,749, dated May 26, 2022, 14 pages.

Final Office Action for U.S. Appl. No. 16/959,749 dated Oct. 6, 2022, 13 pages.

Advisory Action for U.S. Appl. No. 16/959,749, dated Dec. 15, 2022, 3 pages.

Notice of Allowance for U.S. Appl. No. 16/959,749, dated Feb. 28, 2023, 7 pages.

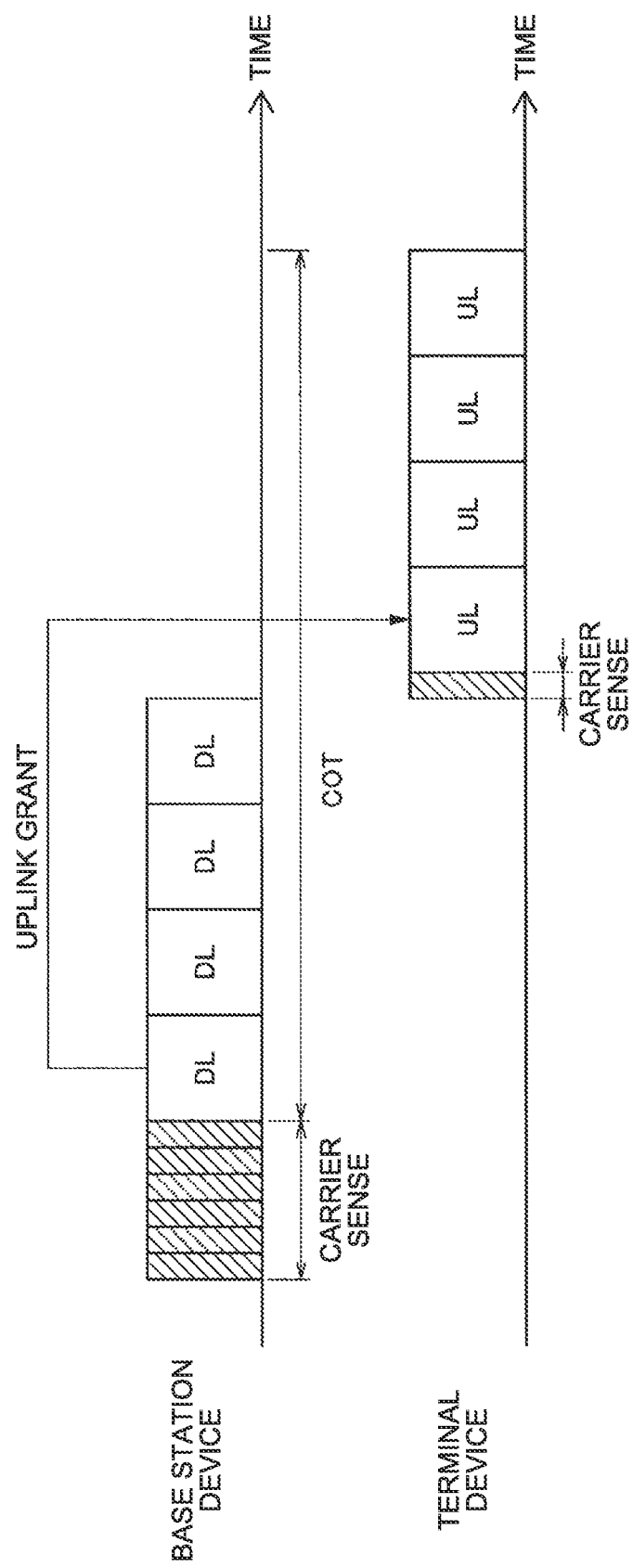

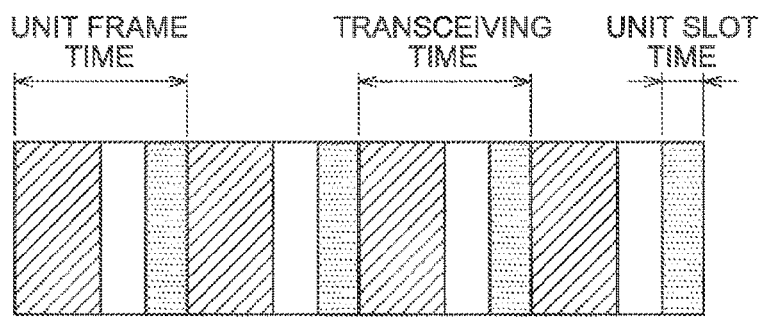
FIG. 3A
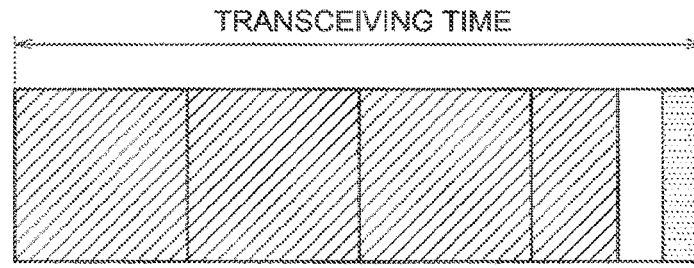
FIG. 3B
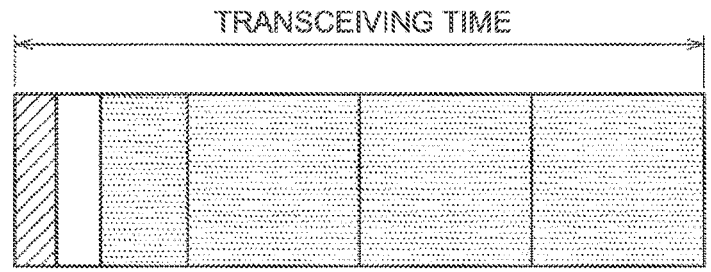
FIG. 3C
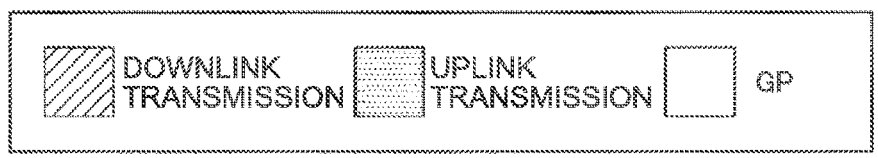

TERMINAL DEVICE, BASE STATION DEVICE, AND METHOD

CROSS REFERENCE TO RELATED APPLICATIONS

This application is a continuation application of U.S. patent application Ser. No. 16/959,749, filed on Jul. 2, 2020, which is a U.S. National Phase of International Patent Application No. PCT/JP2018/040170 filed on Oct. 29, 2018, which claims priority benefit of Japanese Patent Application No. JP 2018-002388 filed in the Japan Patent Office on Jan. 11, 2018. Each of the above-referenced applications is hereby incorporated herein by reference in its entirety.

FIELD

The present disclosure relates to a terminal device, a base station device, and a method.

BACKGROUND

Wireless access schemes and wireless networks of cellular mobile communication (hereinafter also referred to as long term evolution (LTE), LTE-advanced (LTE-A), LTE-advanced pro (LTE-A Pro), new radio (NR), new radio access technology (NRAT), 5G, evolved universal terrestrial radio access (EUTRA), or further EUTRA (FEUTRA)) are under review in 3rd generation partnership project (3GPP). Incidentally, in the following description, LTE includes LTE-A, LTE-A Pro, and EUTRA, and NR includes NRAT, and FEUTRA. In LTE, a base station device (base station) is also referred to as evolved NodeB (eNodeB), and in NR, the base station device (base station) is also referred to as gNodeB (gNB). In LTE and NR, a terminal device (a mobile station, a mobile station device, and a terminal) is also referred to as user equipment (UE). LTE and NR are cellular communication systems in which a plurality of areas covered by base station devices is arranged in a cell shape. A single base station device may manage a plurality of cells.

NR is a wireless access scheme of the next generation of LTE and is a different radio access technology (RAT) from LTE. NR is an access technology that can support various use cases including enhanced mobile broadband (eMBB), massive machine type communications (mMTC), and Ultra reliable and low latency communications (URLLC). NR is examined for a technical framework that addresses usage scenarios, requirements, and deployment scenarios in those use cases.

In an unlicensed band and a license shared band, the operation of a wireless access scheme based on cellular communication is being examined. In such an unlicensed band, coexistence with other nodes and wireless systems is considered important, and in a wireless access scheme such as LTE and NR, functions such as listen before talk (LBT) for performing channel sensing before transmission and discontinuous transmission are required. Details of a wireless access scheme based on NR in the unlicensed band are disclosed in Non Patent Literature 1. Incidentally, the unlicensed band is, for example, a 2.4 GHz band, a 5 GHz band, and a 6 GHz band. The license sharing band is, for example, a 3.5 GHz band or a 37 GHz band.

CITATION LIST

Non Patent Literature

Non Patent Literature 1: RP-172021, "Study on NR-based Access to Unlicensed Spectrum", 3GPP TSG RAN Meeting #77, Sapporo, Japan, Sep. 11-14, 2017.

SUMMARY

Technical Problem

However, in a case where each communication device independently performs LBT in an environment where a plurality of communication devices exists, the use efficiency of radio resources (a frequency resource and a time resource) may be reduced. This is because a waiting time due to sensing for acquiring an access right occurs each time each communication device uses the radio resources.

In this regard, the present disclosure provides a mechanism that enables a plurality of communication devices to use radio resources more efficiently.

Solution to Problem

According to the disclosure, a terminal device is provided that includes: a control unit configured to transmit first resource information, which indicates a radio resource available to another communication device among radio resources of which access rights are acquired by performing carrier sense, on an uplink or a sidelink.

Moreover, according to the disclosure, a base station device is provided that includes: a control unit configured to receive resource information which indicates, among radio resources of which access rights are acquired by a terminal device by performing carrier sense, a resource available to another communication device other than the terminal device from the terminal device and use the resource available to the another communication device for communication.

Moreover, according to the disclosure, a method performed by a processor, the method is provided that includes: transmitting first resource information, which indicates a radio resource available to another communication device among radio resources of which access rights are acquired by performing carrier sense, on an uplink or a sidelink.

Advantageous Effects of Invention

As described above, according to the present disclosure, a mechanism is provided that enables a plurality of communication devices to use radio resources more efficiently. Incidentally, the above effects are not necessarily limited, and any of the effects described in this specification or other effects that can be grasped from this specification may be exerted together with or in place of the above effects.

BRIEF DESCRIPTION OF DRAWINGS

FIG. 2 is a diagram for describing an example of communication in LAA.

FIGS. 3A, 3B, and 3C are diagrams illustrating examples of a frame configuration of self-contained transmission in this embodiment.

DESCRIPTION OF EMBODIMENTS

Figure 1:
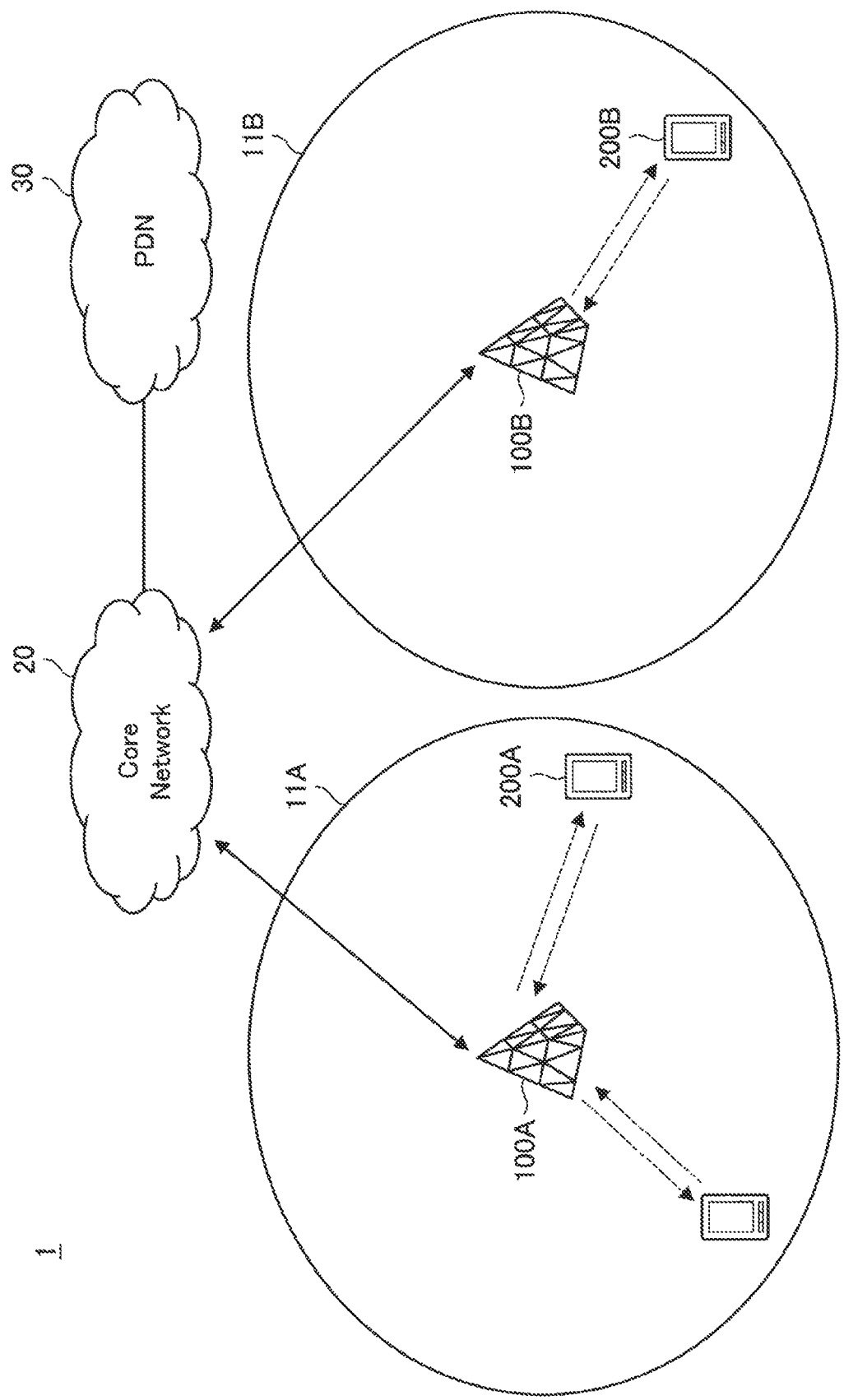
FIG. 1 is a diagram illustrating an example of an overall configuration of a system according to an embodiment of the present disclosure.

Hereinafter, preferred embodiments of the present disclosure will be described in detail with reference to the accompanying drawings. In addition, in this specification and drawing, constituent elements having substantially the same functional configuration are denoted by the same reference numerals, and redundant description is omitted.

The description will be made in the following order.

1. Introduction
1.1. System configuration example
1.2. Technical issues
1.3. Overview of proposed method
1.4. Related technologies
2. Configuration example
2.1. Configuration example of base station device
2.2. Configuration example of terminal device
3. Technical features
3.1. Sharing of sharable resource information
3.2. Sharing access rights
3.3. Contents of sharable resource information
3.4. Transmission method of sharable resource information
3.5. Sharing by second terminal device
3.6. Flow of processing
4. Application example
5. Conclusion 1. Introduction <1.1. System Configuration Example>

FIG. 1 is a diagram illustrating an example of an overall configuration of a system 1 according to an embodiment of the present disclosure. As illustrated in FIG. 1, the system 1 includes a base station device 100 (100A and 100B), a terminal device 200 (200A and 200B), a core network 20, and a packet data network (PDN) 30.

The base station device 100 operates a cell 11 (11A or 11B) and provides a wireless service to one or more terminal devices located inside the cell 11. For example, the base station device 100A provides a wireless service to the terminal device 200A, and the base station device 100B provides a wireless service to the terminal device 200B. The cell 11 can be operated according to any wireless communication system such as LTE or new radio (NR). The base station device 100 is connected to the core network 20. The core network 20 is connected to the PDN 30.

The core network 20 may include a mobility management entity (MME), a serving gateway (S-GW), a PDN gateway (P-GW), a policy and charging rule function (PCRF), and a home subscriber server (HSS). Alternatively, the core network 20 may include entities of the NR having functions similar to those described above. The MME is a control node that handles a signal of a control plane, and manages the moving state of the terminal device. The S-GW is a control node that handles a signal of a user plane, and is a gateway device that switches a transfer path of user data. The P-GW is a control node that handles the signal of the user plane, and is a gateway device serving as a connection point between the core network 20 and the PDN 30. The PCRF is a control node that controls a policy such as quality of service (QoS) for the bearer and charging. The HSS is a control node that handles subscriber data and performs service control.

The terminal device 200 wirelessly communicates with the base station device 100 on the basis of the control by the base station device 100. The terminal device 200 may be a so-called user equipment (UE). For example, the terminal device 200 transmits an uplink signal to the base station device 100 and receives a downlink signal from the base station device 100. The terminal device 200 can also perform device-to-device (D2D) communication. That is, the terminal device 200 can transmit a sidelink signal of another terminal device 200 and receive a sidelink signal from the another terminal device 200.

<1.2. Technical Issues>

Case where base station device acquires access right

Conventionally, in licensed assisted access (LAA), the base station device acquires an access right to a radio resource (hereinafter, also referred to as a channel). Then, the acquired access right is shared by the base station device and the terminal device communicating with the base station device. This point will be described with reference to FIG. 2.

FIG. 2 is a diagram for describing an example of communication in LAA. The upper part of FIG. 2 illustrates carrier sense performed by the base station device and a signal transmitted by the base station device. The lower part of FIG. 2 illustrates carrier sense performed by the terminal device and a signal transmitted by the terminal device. The rectangle described as DL is a time resource for transmitting a downlink signal. The time resource is, for example, a slot or a sub frame. The rectangle described as UL is a time resource for transmitting a downlink signal. As illustrated in FIG. 2, the base station device first performs carrier sense using random back-off, and acquires an access right. Next, on the basis of the acquired access right, the base station device transmits a downlink signal within a period in which the channel may be occupied (channel occupancy time: COT). The COT is the period during which the acquired access right is valid. On the other hand, the base station device instructs the terminal device to perform uplink transmission during the COT by using an uplink grant. Then, after performing carrier sense without using random back-off, the terminal device transmits an uplink signal according to the uplink grant.

A channel access method changes depending on whether or not it is within the COT. Specifically, a communication device performs carrier sense by using random back-off and accesses a channel outside the COT (for example, LBT category 4). On the other hand, the communication device performs carrier sense without using random back-off within the COT, that is, during a period in which the communication device has an access right, and accesses a channel (for example, LBT category 2). In the example illustrated in FIG. 2, the base station device does not acquire the access right at first (that is, is outside the COT), and thus accesses the channel by using random back-off. On the other hand, on the basis of the uplink grant, the terminal device shares the access right acquired by the base station device and accesses the channel without using random back-off during a period in which the access right acquired by the base station device is valid (that is, within the COT). As described above, in the uplink transmission in the LAA, the terminal device does not have to perform the channel access using the random back-off from 1 by sharing the access right.

Various Examination

On the other hand, in LTE and NR, uplink grant-free transmission (also referred to as grantless transmission) is being examined. The grant-free transmission is a method in which the terminal device transmits the uplink signal without receiving the uplink grant from the base station device in a periodic resource semi-statically indicated by radio resource control (RRC) signaling.

In NR, autonomous uplink channel access in which the terminal device acquires an access right is being examined. The autonomous uplink channel access is a method in which, when performing uplink grant-free transmission, the terminal device itself performs LBT using a channel access procedure using random back-off to acquire an access right.

The D2D communication using an unlicensed band is being examined. There is a merit that D2D communication between different operators becomes easier to use by using the unlicensed band for D2D communication.

Technical Issues

Simply acquiring an access right by each terminal device independently may reduce the use efficiency of radio resources. This is because even if the terminal device acquires an access right, there is no mechanism for sharing the acquired access right with another communication device. Therefore, after acquiring an access right, the terminal device once releases the channel for communication by another communication device. Then, the another communication device performs channel access using random back-off from 1, so that a waiting time occurs.

<1.3. Overview of Proposed Method>

Therefore, in one embodiment of the present disclosure, in view of the technical problem described above, a mechanism is propose in which the access right acquired by the terminal device 200 can be shared by another communication device (for example, the base station device 100 or another terminal device 200).

In this embodiment, first, the terminal device 200 acquires an access right by performing channel access using random back-off. Thereafter, the terminal device 200 transmits information, which indicates the radio resource available to another communication device among the radio resources of which the access rights are acquired, on the uplink or the sidelink. Accordingly, the another communication device that receive such information can perform communication by sharing the access right acquired by the terminal device 200 without acquiring an access right by itself. Specifically, the another communication device performs communication by performing channel access without using random back-off in the radio resource related to the access right acquired by the terminal device 200. The another communication devices can perform communication without acquiring the access right, so that the processing load is reduced. In addition, since the carrier sense using the random back-off is not performed, the waiting time is reduced, so that the use efficiency of the radio resources can be improved.

<1.4. Related Technologies>

Hereinafter, a technology related to the proposed technique will be described.

<Frame Configuration of NR in this Embodiment>

In NR, a physical channel and/or a physical signal may be transmitted by a self-contained transmission. FIGS. 3A, 3B, and 3C illustrate examples of a frame configuration of self-contained transmission in this embodiment. In the self-contained transmission, one transceiving is configured in the order of a continuous downlink transmission, a GP, and a continuous downlink transmission from the beginning. The continuous downlink transmission includes at least one downlink control information and DMRS. The downlink control information gives an instruction on reception of a downlink physical channel included in the continuous downlink transmission or transmission of an uplink physical channel included in the continuous uplink transmission. In a case where the downlink control information gives the instruction on reception of the downlink physical channel, the terminal device 200 attempts to receive the downlink physical channel on the basis of the downlink control information. Then, the terminal device 200 transmits the reception success/failure (decoding success/failure) of the downlink physical channel by using the uplink control channel included in the uplink transmission allocated after the GP. On the other hand, in a case where the downlink control information gives the instruction on transmission of the uplink physical channel, the transmitted uplink physical channel is transmitted being included in the uplink transmission on the basis of the downlink control information. In this way, by flexibly switching between transmission of uplink data and transmission of downlink data according to the downlink control information, it is possible to immediately respond to an increase or decrease in the traffic ratio between the uplink and the downlink. Further, by providing notification of the reception success/failure of the downlink by the immediately following uplink transmission, it is possible to realize the low-delay communication of the downlink.

A unit slot time is a minimum time unit that defines a downlink transmission, a GP, or an uplink transmission. The unit slot time is reserved for any of the downlink transmission, the GP, or the uplink transmission. The unit slot time does not include both downlink transmission and uplink transmission. The unit slot time may be a minimum transmission time of a channel associated with a DMRS included in the unit slot time. One unit slot time is defined, for example, as an integral multiple of a sampling interval ($T_s$) of NR and a symbol length.

A unit frame time may be a minimum time specified in the scheduling. The unit frame time may be a minimum unit at which a transport block is transmitted. The unit slot time may be the maximum transmission time of a channel associated with the DMRS included in the unit slot time. The unit frame time may be a unit time for determining uplink transmission power in the terminal device 200. The unit frame time may be referred to as a sub frame. There are three types of unit frame time of downlink transmission only, uplink transmission only, and a combination of uplink transmission and downlink transmission. One unit frame time is defined by, for example, an integral multiple of a sampling interval ($T_s$) of NR, a symbol length, and a unit slot time.

A transceiving time is a time of one transceiving. The time between one transceiving and another transceiving is occupied by a time (gap) during which no physical channel or physical signal is transmitted. The terminal device 200 does not have to average the CSI measurement between different transceivings. The transceiving time may be referred to as TTI. One transceiving time is defined by, for example, an integer multiple of a sampling interval ($T_s$) of NR, a symbol length, a unit slot time, and a unit frame time.

<Channel Access Procedure for Unlicensed Channel>

The channel access (Channel access and Listen before Talk) procedure is performed to access an unlicensed channel for performing transmission by the base station device or the terminal device.

In the channel access procedure, one or more times of channel sensing are performed. On the basis of the sensing result, it is determined (empty determination) whether the channel is idle (unoccupied, available, enable) or busy (busy, occupied, unavailable, disable). In channel sensing, the power of the channel during a predetermined waiting time is sensed.

Examples of the waiting time of the channel access procedure include a first waiting time (slot), a second waiting time, a third waiting time (defer period), and a fourth waiting time.

A slot is a unit of waiting time of the base station device and the terminal device in the channel access procedure. A slot is defined by, for example, nine microseconds.

In the second waiting time, one slot is inserted at the head. The second waiting time is defined, for example, as 16 microseconds.

The defer period is configured by a second waiting time and a plurality of consecutive slots following the second waiting time. The number of consecutive slots following the second waiting time is determined on the basis of a priority class (channel access priority class) used to satisfy QoS.

The fourth waiting time is configured by the second waiting time and one slot following the second waiting time.

The base station device or the terminal device senses a predetermined channel during a predetermined slot period. In a case where the power detected by the base station device or the terminal device for at least four microseconds within the predetermined slot period is smaller than a predetermined power detection threshold, the predetermined slot is considered to be idle. On the other hand, in a case where the power is greater than a predetermined power detection threshold, the predetermined slot is considered to be busy.

The channel access procedure includes a first channel access procedure and a second channel access procedure. The first channel access procedure is the first channel access procedure is performed using a plurality of slots and defer periods. The second channel access procedure is performed using one fourth waiting time.

The parameters related to channel access are determined on the basis of the priority class. Examples of the parameters related to channel access include a minimum contention window, a maximum contention window, a maximum channel occupation time, and a value that the contention window can take. The priority class is determined by a value of a QoS class identifier (QCI) that processes quality of service (QoS). Table 1 shows a correspondence table between priority classes and parameters related to channel access, and Table 2 shows an example of mapping between priority classes and QCIs.

TABLE 1 one example of correspondence table between priority class and parameters related to channel access

| Channel access priority class (p) | $m_p$ | Minimum contention window $CW_{min,p}$ | Maximum contention window $CW_{max,p}$ | Maximum channel occupation time $T_{mcot,p}$ | Possible value of contention window $CW_P$ |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

TABLE 2

One example of mapping between priority class and QCI

| Channel access priority class | QCI |
|---|---|
| 1 | 1, 3, 5, 65, 66, 69, |
| 2 | 2, 7 |
| 3 | 4, 6, 8, 9 |
| 4 | Other than above |

<Details of First Channel Access Procedure>

In the first channel access procedure, the following procedure is performed.

(0) Channel sensing is performed during the defer period. In a case where the channel is idle in the slot within the defer period, the process proceeds to Step (1), and otherwise, the process proceeds to Step (6).

(1) The initial value of a counter is obtained. The possible value of the initial value of the counter is an integer between zero and a contention window CW. The initial value of the counter is determined randomly according to a uniform distribution. The initial value of the counter is set in a counter N, and the process proceeds to the Step (2).

(2) In a case where the counter N is larger than zero and the counter N is selected to be subtracted, one is subtracted from the counter N. Thereafter, the process proceeds to the Step (3).

(3) A slot period is added to waiting. Further, in the additional slot, the channel is sensed. In a case where the additional slot is idle, the process proceeds to Step (4), and otherwise, the process proceeds to Step (5).

(4) In a case where the counter N is zero, this procedure is stopped. Otherwise, the process proceeds to Step (2).

(5) A defer period is added to waiting. Further, the channel is sensed until any one of the slots included in the additional defer period is detected as busy, or until all the slots included in the additional defer period can be detected as idle. Thereafter, the process proceeds to the Step (6).

(6) In a case where the channel is sensed as idle in all the slots included in the additional defer period, the process proceeds to Step (4), and otherwise, the process proceeds to Step (5).

After the stop of the Step (4) in the above procedure, transmission including data such as PDSCH and PUSCH is performed on the channel.

Incidentally, after the stop of the Step (4) in the above procedure, transmission may not be performed on the channel. In this case, thereafter, in a case where the channel is idle immediately before transmission in all the slots and the defer period, transmission may be performed without performing the above procedure. On the other hand, in a case where the channel is not idle in any of the slots and the defer period, the channel was sensed as idle in all of the slots in the additional defer period, and then the process proceeds to Step (1) in the above procedure.

<Details of Second Channel Access Procedure>

In the second channel access procedure, the transmission may occur immediately after the channel is considered to be idle as a result of sensing of at least the fourth waiting time. On the other hand, in a case where the channel is considered not to be idle as a result of sensing of at least the fourth waiting time, transmission is not performed.

<Contention Window Adaptation Procedure>

The contention window (CW) used in the first channel access procedure is determined on the basis of the contention window adaptation procedure.

The value of the contention window CW is held for each priority class. The contention window CW takes a value between the minimum contention window and the maximum contention window. The minimum contention window and the maximum contention window are determined on the basis of the priority class.

The adjustment of the value of the contention window CW is performed before Step (1) of the first channel access procedure. In a case where the proportion of NACK in the HARQ response corresponding to the shared channel of at least the reference sub frame or reference HARQ process in the contention window adaptation procedure is higher than a threshold, the value of the contention window CW is increased, and otherwise, the value of the contention window CW is set to the minimum contention window.

The value of the contention window CW is increased on the basis of, for example, the equation $CW=2\times(CW+1)-1$.

<Details of Channel Access Procedure in Downlink>

In a case where downlink transmission including PDSCH, PDCCH, and/or EPDCCH is performed on the unlicensed channel, the base station device accesses the channel on the basis of the first channel access procedure and performs the downlink transmission.

On the other hand, in a case where downlink transmission that includes the DRS but does not include the PDSCH is performed in the unlicensed channel, the base station device accesses the channel on the basis of the second channel access procedure and performs the downlink transmission. Note that the period of the downlink transmission is preferably smaller than one millisecond.

<Details of Channel Access Procedure in Uplink>

In a case where an instruction to perform the first channel access procedure in the uplink grant for scheduling the PUSCH is given in the unlicensed channel, the terminal device performs the first channel access procedure before the uplink transmission including the PUSCH.

In a case where an instruction to perform the second channel access procedure is given in the uplink grant for scheduling the PUSCH, the terminal device performs the second channel access procedure before the uplink transmission including the PUSCH.

For uplink transmissions which does not include the PUSCH but includes the SRS, the terminal device performs the second channel access procedure before the uplink transmission.

In a case where the end of the uplink transmission indicated by the uplink grant is within the uplink period (UL duration), regardless of the procedure type indicated by the uplink grant, the terminal device transmits the second channel access procedure before the uplink transmission.

In a case where uplink transmission continues with the fourth waiting time interposed after the end of downlink transmission from the base station, the terminal device performs the second channel access procedure before the uplink transmission.

<Channel Access Procedure of NR in this Embodiment>

In the channel access procedure in the unlicensed channel using NR, non-beamformed channel sensing and beamformed channel sensing are performed.

The non-beamformed channel sensing is channel sensing by reception in which directivity is not controlled, or channel sensing without direction information. The channel sensing without direction information is, for example, channel sensing in which measurement results are averaged in all directions. The transmitting station does not need to recognize the directivity (angle and direction) used in the channel sensing.

The beamformed channel sensing is channel sensing by reception in which directivity is controlled, or channel sensing with direction information. That is, the beamformed channel sensing is channel sensing in which the reception beam is directed in a predetermined direction. A transmitting station having a function of performing beamformed channel sensing can perform one or more times of channel sensing using different directivities.

By performing beamformed channel sensing, the area detected by sensing is reduced. Accordingly, the transmitting station can reduce the frequency of detecting a communication link that does not cause interference and can reduce the problem of the terminals.

2. Configuration Example

<2.1. Configuration Example of Base Station Device>

Figure 4:
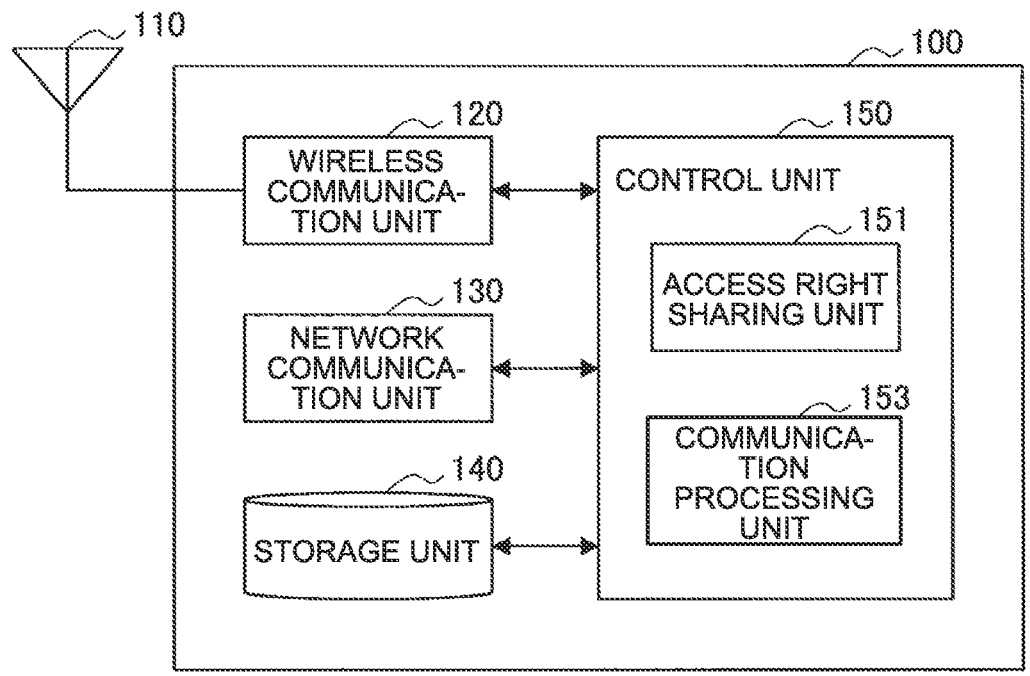
FIG. 4 is a block diagram illustrating an example of a configuration of a base station device according to this embodiment.

FIG. 4 is a block diagram illustrating an example of a configuration of the base station device 100 according to this embodiment. Referring to FIG. 4, the base station device 100 includes an antenna unit 110, a wireless communication unit 120, a network communication unit 130, a storage unit 140, and a control unit 150.

(1) Antenna Unit 110

The antenna unit 110 radiates a signal output by the wireless communication unit 120 into space as a radio wave. Further, the antenna unit 110 converts the radio wave in space into a signal, and outputs the signal to the wireless communication unit 120.

(2) Wireless Communication Unit 120

The wireless communication unit 120 transmits and receives signals. For example, the wireless communication unit 120 transmits a downlink signal to the terminal device and receives an uplink signal from the terminal device.

(3) Network Communication Unit 130

The network communication unit 130 transmits and receives information. For example, the network communication unit 130 transmits information to another node and receives information from another node. For example, the another node includes another base station and another core network node.

(4) Storage Unit 140

The storage unit 140 temporarily or permanently stores a program and various data for the operation of the base station device 100.

(5) Control Unit 150

The control unit 150 controls the overall operation of the base station device 100 to provide various functions of the base station device 100. The control unit 150 includes an access right sharing unit 151 and a communication processing unit 153.

The access right sharing unit 151 has a function of performing a process relating to sharing of the access right acquired by the terminal device 200. For example, the access right sharing unit 151 acquires information on the radio resource of which the access right is acquired by the terminal device 200. In addition, the access right sharing unit 151 performs such a process that the radio resource of which the access right is acquired by the terminal device 200 is used by the terminal device 200 other than the terminal device 200 which acquire the access right.

The communication processing unit 153 has a function of performing communication processing with the terminal device 200. The communication processing unit 153 performs different processes depending on whether the radio resource used for communication is the radio resource of which the access right is acquired. Specifically, in a case where the radio resource of which the access right is not acquired is used, the communication processing unit 153 performs communication by performing channel access using random back-off. On the other hand, in a case where the radio resource of which the access right is acquired by the terminal device 200 is used, the communication processing unit 153 performs communication by performing channel access without using random back-off.

The control unit 150 may further include other components other than these components. That is, the control unit 150 can perform operations other than the operations of these components.

<2.2. Configuration Example of Terminal Device>

Figure 5:
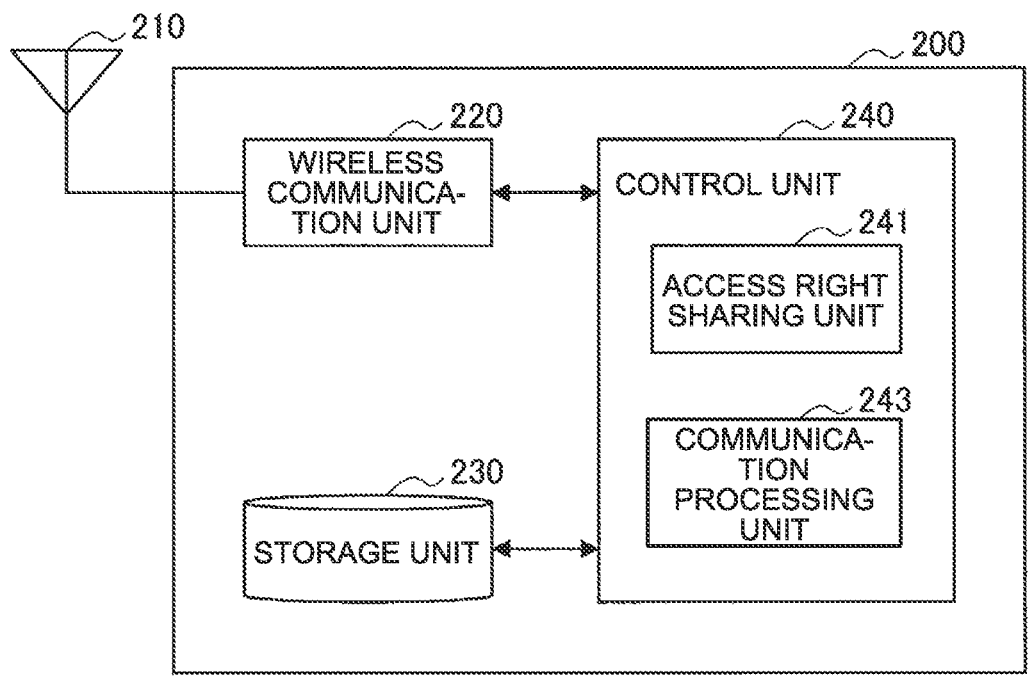
FIG. 5 is a block diagram illustrating an example of a configuration of a terminal device according to this embodiment.

FIG. 5 is a block diagram illustrating an example of a configuration of the terminal device 200 according to this embodiment. Referring to FIG. 5, the terminal device 200 includes an antenna unit 210, a wireless communication unit 220, a storage unit 230, and a control unit 240.

(1) Antenna Unit 210

The antenna unit 210 radiates a signal output by the wireless communication unit 220 into space as a radio wave. Further, the antenna unit 210 converts the radio wave in space into a signal, and outputs the signal to the wireless communication unit 220.

(2) Wireless Communication Unit 220

The wireless communication unit 220 transmits and receives signals. For example, the wireless communication unit 220 receives a downlink signal from the base station and transmits an uplink signal to the base station. Further, the wireless communication unit 220 receives a sidelink signal from another terminal device 200 and transmits a sidelink signal to another terminal device 200.

(3) Storage Unit 230

The storage unit 230 temporarily or permanently stores a program for operating the terminal device 200 and various data.

(4) Control Unit 240

The control unit 240 controls the overall operation of the terminal device 200 to provide various functions of the terminal device 200. The control unit 240 includes an access right sharing unit 241 and a communication processing unit 243.

The access right sharing unit 241 performs a process relating to sharing of the access right. The terminal device 200 may acquire the access right by itself. In that case, the access right sharing unit 241 transmits information on the radio resource that acquires the access right to another communication device (for example, the base station device 100 or another terminal device 200). The terminal device 200 may share the access right acquired by another terminal device 200. In that case, the access right sharing unit 241 acquires information on the radio resource of which the access right is acquired by the another terminal device 200.

The communication processing unit 243 has a function of performing communication processing with another communication device. The communication processing unit 243 performs different processes depending on whether the radio resource used for communication is the radio resource of which the access right is acquired. Specifically, in a case where the radio resource of which the access right is not acquired is used, the communication processing unit 243 acquires the access right by performing channel access using random back-off and then performs communication. On the other hand, in a case where the radio resource of which the access right is acquired by the terminal device 200 itself or another terminal device 200 is used, the communication processing unit 243 performs communication by performing channel access without using random back-off.

The control unit 240 may further include other components other than these components. That is, the control unit 240 can perform operations other than the operations of these components.

3. Technical Features

<3.1. Sharing of Sharable Resource Information>

The terminal device 200 (for example, the communication processing unit 243) acquires an access right by performing carrier sense. Specifically, the terminal device 200 performs carrier sense using random back-off, and obtains the access right to the radio resource. Then, the terminal device 200 (for example, the access right sharing unit 241) transmits resource information, which indicates the radio resource available to another communication device among the radio resources of which the access rights are acquired, on the uplink or the sidelink. Accordingly, the another communication device can share the access right acquired by the terminal device 200. Hereinafter, the another communication device is also referred to as a shared communication device. The shared communication device includes the base station device 100 and another terminal device 200.

The terminal device 200 that acquires the access right is also referred to as a first terminal device 200. Further, another terminal device 200 which is the terminal device 200 and shares the access right acquired by the first terminal device 200 is also referred to as a second terminal device 200. The terminal device 200 can function as both the first terminal device 200 and the second terminal device 200. In a case where the terminal device 200 functions as the first terminal device 200, the resource information transmitted by the first terminal device 200 corresponds to first resource information. In a case where the terminal device 200 functions as the second terminal device 200, the resource information transmitted from the first terminal device 200 and received by the second terminal device 200 corresponds to second resource information.

Among the radio resources of which the access rights are acquired by the first terminal device 200, the radio resource available to the shared communication device is also referred to as a sharable resource below. The sharable resource may be regarded as a radio resource of which the access right is acquired by the first terminal device 200 or may be regarded as a radio resource not used by the first terminal device 200 among the radio resources of which the access rights are acquired by the first terminal device 200. Focusing on the time resource, the sharable resource may be regarded as a COT, or may be regarded as a section of the COT that is not used by the first terminal device 200. In addition, resource information indicating a sharable resource is hereinafter also referred to as sharable resource information.

<3.2. Sharing of Access Right>

In a case where receiving the sharable resource information, the shared communication device transmits a signal on the basis of the received sharable resource information by using the sharable resource. Here, the sharable resource information is information indicating a resource available to another communication device other than the first terminal device 200 among radio resources of which the access rights are acquired by the first terminal device 200 by performing carrier sense.

(1) Sharing by Base Station Device 100

A case where the shared communication device is the base station device 100 will be described.

The base station device 100 (for example, communication processing unit 153) may use the sharable resource for communication on the basis of the sharable resource information. In that case, the base station device 100 transmits a signal using the sharable resource. That is, the base station device 100 transmits the signal using the radio resource not used by the first terminal device 200 among the radio resources of which the access rights are acquired by the first terminal device 200 acquires the access right. At that time, the base station device 100 performs channel access without performing carrier sense using random back-off. For example, the base station device 100 may perform carrier sense without using random back-off and perform channel access. Further, the base station device 100 may perform channel access without first performing carrier sense. Incidentally, the signal transmission destination may be the first terminal device 200 or another terminal device 200 connected to the base station device 100.

In addition, the base station device 100 may cause the second terminal device 200 to use the sharable resource. In that case, on the basis of the sharable resource information, the base station device 100 (for example, the access right sharing unit 151) transmits a grant message (for example, uplink grant) giving an instruction on the transmission of a signal in the sharable resource to the terminal device 200 (corresponding to the second terminal device 200) other than the first terminal device 200. Then, the second terminal device 200 transmits a signal (for example, an uplink signal) on the basis of the received grant message by using the sharable resource. More specifically, the second terminal device 200 transmits the signal by using the radio resource not used by the first terminal device 200 and the base station device 100 among the radio resources of which the access rights are acquired by the first terminal device 200. At this time, the second terminal device 200 performs channel access without performing carrier sense using random back-off. For example, the second terminal device 200 may perform carrier sense without using random back-off and perform channel access. Further, the second terminal device 200 may perform channel access without first performing carrier sense.

In any case, the base station device 100 and the second terminal device 200 do not perform carrier sense using random back-off, and thus the waiting time for channel access is reduced. That is, it is possible to improve the use efficiency of the radio resources.

(2) Sharing by Second Terminal Device 200

A case where the shared communication device is the second terminal device 200 will be described.

The second terminal device 200 (for example, the communication processing unit 243) transmits a signal on the basis of the sharable resource information by using the sharable resource. That is, the second terminal device 200 transmits the signal using the radio resource not used by the first terminal device 200 among the radio resources of which the access rights are acquired by the first terminal device 200. At this time, the second terminal device 200 performs channel access without performing carrier sense using random back-off. For example, the second terminal device 200 may perform carrier sense without using random back-off and perform channel access. Further, the second terminal device 200 may perform channel access without first performing carrier sense.

In any case, the second terminal device 200 does not perform carrier sense using random back-off, and thus the waiting time for channel access is reduced. That is, it is possible to improve the use efficiency of the radio resources.

(3) Restriction During Sharing

A predetermined restriction may be imposed on the shared communication device at the time of sharing the access right. Specifically, the type of the signal that can be transmitted using sharable resource may be limited.

For example, the signal that the shared communication device can transmit by using the sharable resource is limited to a signal including data which has a higher channel access priority class than the data transmitted by the first terminal device 200 (that is, higher priority). Further, the signal that the shared communication device can transmit by using the sharable resource may be limited to a control signal/control channel. Further, the signal that the shared communication device can transmit by using the sharable resource may be limited to a signal including a communication parameter to be used in the sharable resource described later.

<3.3. Contents of Sharable Resource Information>

The sharable resource information may include various information. The sharable resource information includes information indicating the radio resource of which the access right is acquired. Further, the sharable resource information may include information indicating a radio resource to be used.

(1) Information indicating radio resource of which access right is acquired For example, the sharable resource information may include information indicating a radio resource of which the access right is acquired by the first terminal device 200. In this case, the sharable resource information includes information indicating the frequency of the radio resource of which the access right is acquired by the first terminal device 200 and information indicating the time. Accordingly, the shared communication device can recognize the radio resource of which the access right is acquired by the first terminal device 200.

Attention is given to the time information in the information indicating the radio resource of which the access right is acquired by the first terminal device 200. The information indicating the time of the radio resource of which the access right is acquired by the first terminal device 200 is information indicating the time during which the channel may be occupied (that is, COT). The information indicating the COT includes information indicating the start timing, the end timing, and/or the length of the COT. Hereinafter, an example will be described.

For example, the sharable resource information may include information indicating an interval from a time resource at which the sharable resource information is transmitted to a last time resource of the radio resources in which the first terminal device 200 acquires the access right. In other words, the sharable resource information includes information indicating the remaining time of the COT based on the time resource at which the sharable resource information is transmitted. Here, the time resource is, for example, a symbol, a slot, and/or a sub frame, and the information indicating the interval is, for example, the number of symbols, the number of slots, and/or the number of sub frames. The shared communication device adds the symbol number, the number of slots, and/or the sub frame number to the symbol number, the slot number, and/or the sub frame number that receives the resource information, so as to recognize for the last symbol, the slot, and/or the sub frame of the radio resource of which the access right is acquired by the first terminal device 200.

For example, the sharable resource information may include information indicating the last time resource of the radio resource of which the access right is acquired by the first terminal device 200. Here, the time resource is, for example, a symbol, a slot, and/or a sub frame, and the information indicating the time resource is, for example, a symbol number, a slot number, and/or a sub frame number.

For example, the sharable resource information may include information indicating the first time resource of the radio resource of which the access right is acquired by the first terminal device 200. Here, the time resource is, for example, a symbol, a slot, and/or a sub frame, and the information indicating the time resource is, for example, a symbol number, a slot number, and/or a sub frame number.

For example, the sharable resource information may include information indicating a time length (that is, the length of the COT) of the radio resource of which the access right is acquired by the first terminal device 200. However, if this information is already known to the shared communication device, the information need not be transmitted in the sharable resource information. For example, in a case where the length of the COT is determined by the channel access priority class, the sharable resource information may include information indicating the channel access priority class.

The example of the information indicating the COT has been described above.

(2) Information Indicating Radio Resources to be Used

For example, the sharable resource information may include information indicating the radio resource to be used by the first terminal device 200 (hereinafter, also referred to as a radio resource to be used) among the radio resources of which the access rights are acquired by the first terminal device 200. In this case, the sharable resource information includes information indicating the frequency of the radio resource to be used by the first terminal device 200 among the radio resources of which the access rights are acquired by the first terminal device 200 and information indicating the time. With reference to this information, the shared communication device can recognize a radio resource not to be used by the first terminal device 200. Therefore, the shared communication device can efficiently access the sharable resources, for example, by accessing the radio resource not to be used by the first terminal device 200.

Attention is given to time information in the information indicating the radio resources to be used. The information indicating the time of the radio resource to be used includes information indicating the start timing, the end timing, and/or the length of the time resource to be used (that is, the time resource to be used by the first terminal device 200 in the COT).

Note that the shared communication device can use the sharable resource even if information indicating the radio resource to be used is not provided. In a case where the information indicating the radio resource to be used is not provided, on the basis of the information indicating the COT, the shared communication device performs carrier sense without using random back-off within the COT regardless of whether the first terminal device 200 uses or does not use the radio resource. Then, when the use of the channel by the first terminal device 200 ends, the shared communication device detects an empty channel and starts using the sharable resource.

The radio resource to be used may be specified by the base station device 100 using RRC signaling or the like. In that case, the base station device 100 can grasp the radio resources to be used in advance without providing information indicating the radio resources to be used.

<3.4. Transmission Method of Sharable Resource Information>

(1) Time resource for transmitting sharable resource information

The first terminal device 200 (for example, the access right sharing unit 241) may transmit the sharable resource information in a part of the time resources used continuously.

For example, the first terminal device 200 may transmit the sharable resource information in the first time resource of the time resources used continuously. In this case, it is desirable that the sharable resource information includes at least information indicating the end timing of the COT and information indicating the end timing of the radio resource to be used. Accordingly, the shared communication device can recognize the radio resources from the end timing of the radio resource to be used to the end timing of the COT as the sharable resource.

For example, the first terminal device 200 may transmit the sharable resource information in the later time resource of the time resources used continuously. In this case, it is desirable that the sharable resource information includes at least information indicating the end timing of the COT. Accordingly, the shared communication device can share the access right acquired by the first terminal device 200 until the end timing of the COT.

In any case, the shared communication device can recognize the sharable resources with the minimum overhead.

The first terminal device 200 (for example, the access right sharing unit 241) may transmit the sharable resource information in all of the time resources used continuously. In this case, even if the reception of the sharable resource information fails in some time resources, the shared communication device receives the sharable resource information in another time resource and can share the access right acquired by the first terminal device 200.

Hereinafter, the use of the sharable resource by the shared communication device when the sharable resource information is transmitted in all the time resources of the time resources used continuously will be described with reference to FIGS. 6 and 7.

Figure 6:
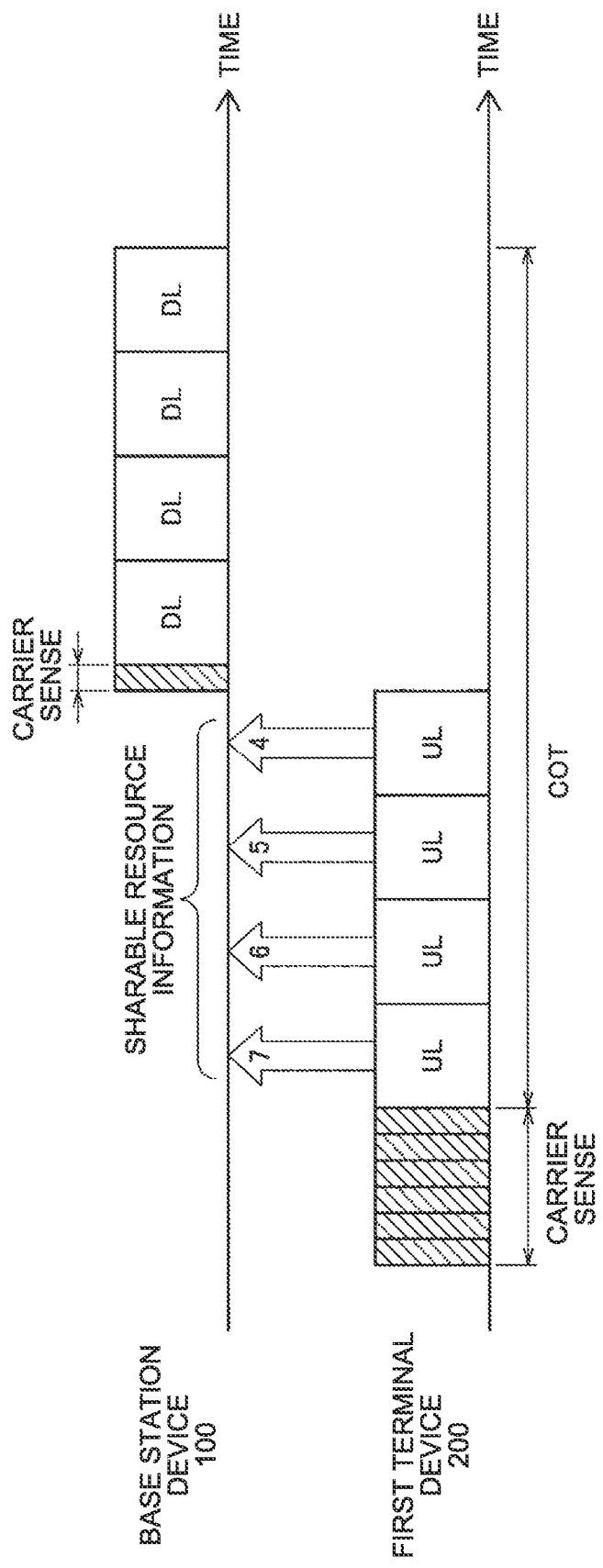
FIG. 6 is a diagram for describing an example of sharing an access right according to this embodiment.
Figure 7:
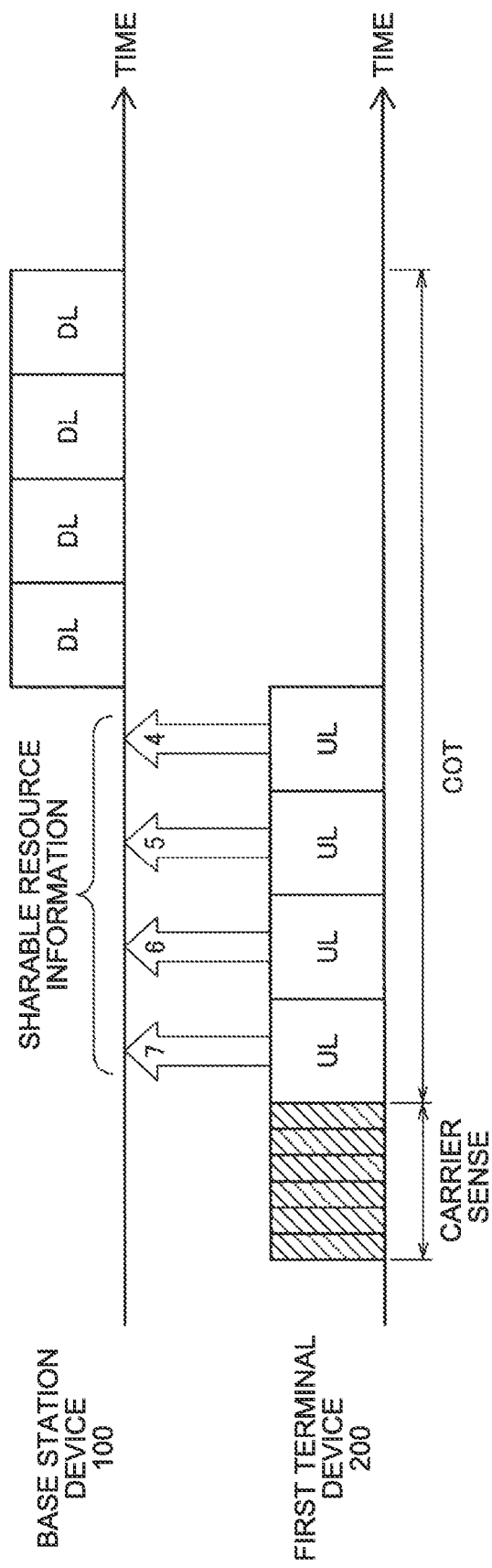
FIG. 7 is a diagram for describing another example of sharing the access right according to this embodiment.

FIG. 6 is a diagram for describing an example of sharing an access right according to this embodiment. In the example illustrated in FIG. 6, the base station device 100 corresponds to a shared communication device. The upper part of FIG. 6 illustrates carrier sense performed by the base station device 100 and a signal transmitted by the base station device 100. The lower part of FIG. 6 illustrates carrier sense performed by the first terminal device 200 and a signal transmitted by the first terminal device 200. The rectangle described as DL is a time resource for transmitting a downlink signal. The rectangle described as UL is a time resource for transmitting a downlink signal.

As illustrated in FIG. 6, the first terminal device 200 first performs carrier sense using random back-off, and acquires an access right. Next, the first terminal device 200 transmits an uplink signal within the COT on the basis of the acquired access right. At this time, the first terminal device 200 performs uplink transmission of the sharable resource information in all time resources of the time resources used continuously. In the example illustrated in FIG. 6, as the sharable resource information, the information indicating the remaining time of the COT based on the time resource at which the sharable resource information is transmitted is transmitted. In the example illustrated in FIG. 6, the first terminal device 200 acquires access rights for eight time resources. Then, the first terminal device 200 performs uplink transmission of the sharable resource information indicating that access rights to the seven remaining time resources are acquired in the first time resource.

After that, the first terminal device 200 performs uplink transmission of the sharable resource information indicating that six, five, and four access rights are acquired for the second, third, and fourth time resources. The base station device 100 can recognize the remaining time of the COT on the basis of the sharable resource information. The first terminal device 200 transmits the fourth uplink signal lastly and stops transmitting the uplink signal. The base station device 100 recognizes an empty channel by carrier sense without using random back-off in the fifth time resource. That is, the base station device 100 recognizes that the radio resources from the fifth time resource to the end timing of the COT can be used. Accordingly, as illustrated in FIG. 6, the base station device 100 can transmit the downlink signal by using the sharable resource.

The base station device 100 may perform channel access without first performing carrier sense. An example in that case is illustrated in FIG. 7. FIG. 7 is a diagram for describing an example of sharing the access right according to this embodiment. The example illustrated in FIG. 7 is the same as the example illustrated in FIG. 6, except that base station device 100 does not perform carrier sense.

(2) Physical Channel on which Sharable Resource Information is Transmitted

The first terminal device 200 (for example, the access right sharing unit 241) can transmit sharable resource information by using various physical channels.

Same physical channel as physical channel used for data transmission

The first terminal device 200 may transmit sharable resource information by using the physical channel used for data transmission. Such physical channels include, for example, a Physical uplink shared channel (PUSCH) and a physical sidelink shared channel (PSSCH). In this case, the first terminal device 200 can collectively apply signal processing such as encoding to data and sharable resource information. Therefore, a resource efficiency can be improved.

Physical channel different from physical channel used for data transmission The first terminal device 200 may transmit the sharable resource information by using a physical channel different from the physical channel used for data transmission. Specifically, the first terminal device 200 multiplexes a physical channel used for data transmission and a physical channel used for transmission of the sharable resource information by means such as time division multiplexing (TDM) or frequency division multiplexing (FDM) and transmits the physical channels. Therefore, the first terminal device 200 can make the target error rate and the delay requirement different by applying different MCS or coding methods for the data and the sharable resource information. Further, in a case where the sharable resource information is continuously transmitted in continuous time resources, the information of the physical channel used for transmission of the sharable resource information is the same between continuous time resources. That is, it can be handled as repeated transmission. Therefore, in a case where the sharable resource information is different between continuous time resources, soft-combining of physical channels is facilitated, and reception quality can be improved.

Examples of the physical channel different from the physical channel used for data transmission include a physical channel used for transmission of the control information. Examples of such a physical channel include a physical uplink control channel (PUCCH) and a physical sidelink control channel (PSCCH).

Physical channels that can be received in common between different operators

The first terminal device 200 may transmit the sharable resource information by using the physical channel (or the physical signal) that can be commonly received by different operators. The first terminal device 200 broadcasts the sharable resource information by using such a physical channel. Then, the base station device and the terminal device of an operator different from the operator that provides the first terminal device 200 with the wireless service can receive the sharable resource information. That is, the base station device and the terminal device of the different operator can recognize the radio resources in which the access right is acquired by the first terminal device 200. Therefore, the opportunity and accuracy of carrier sense by the base station device and terminal device of the different operator are improved. Further, coordination between different operators is facilitated.

<3.5. Sharing by Second Terminal Device>

Hereinafter, sharing of the access right by the second terminal device 200 will be described in detail.

(1) Types of Sharing Access Right

Sharing Access Right Via Base Station Device 100

The sharing of the access right may be performed via the base station device 100. In that case, the first terminal device 200 transmits the sharable resource information to the base station device 100 on the uplink. Then, as described in section 3.2 (1), the second terminal device 200 transmits a signal on the basis of the instruction from base station device 100 by using the sharable resources. This point will be described with reference to FIG. 8.

Figure 8:
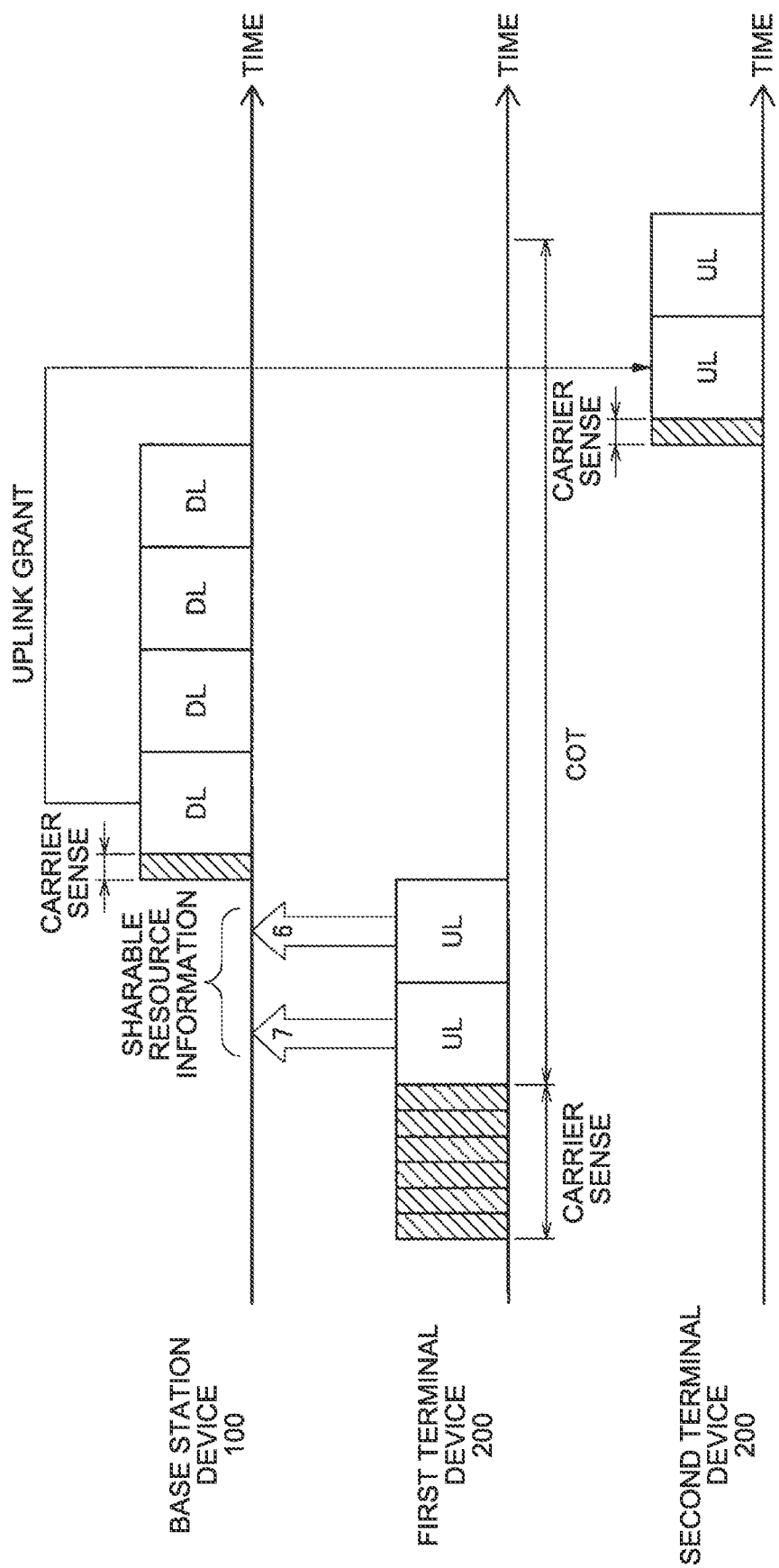
FIG. 8 is a diagram for describing still another example of sharing the access right according to this embodiment.

FIG. 8 is a diagram for describing an example of sharing the access right according to this embodiment. In the example illustrated in FIG. 8, the base station device 100 and the second terminal device 200 correspond to a shared communication device. The upper part of FIG. 8 illustrates carrier sense performed by the base station device 100 and a signal transmitted by the base station device 100. The middle part of FIG. 8 illustrates carrier sense performed by the first terminal device 200 and a signal transmitted by the first terminal device 200. The lower part of FIG. 8 illustrates carrier sense performed by the second terminal device 200 and a signal transmitted by the second terminal device 200. The rectangle described as DL is a time resource for transmitting a downlink signal. The rectangle described as UL is a time resource for transmitting a downlink signal.

As illustrated in FIG. 8, the first terminal device 200 first performs carrier sense using random back-off, and acquires an access right. Next, the first terminal device 200 transmits an uplink signal within the COT on the basis of the acquired access right. At this time, the first terminal device 200 performs uplink transmission of the sharable resource information in all time resources of the time resources used continuously. In the example illustrated in FIG. 8, as the sharable resource information, the information indicating the remaining time of the COT based on the time resource at which the sharable resource information is transmitted is transmitted. In the example illustrated in FIG. 8, the first terminal device 200 acquires access rights for eight time resources. Then, the first terminal device 200 performs uplink transmission of the sharable resource information indicating that access rights to the seven remaining time resources are acquired in the first time resource.

Thereafter, the first terminal device 200 performs uplink transmission of the sharable resource information indicating that access rights to the six remaining time resources are acquired in the second time resource. The base station device 100 can recognize the remaining time of the COT on the basis of the sharable resource information. The first terminal device 200 transmits the second uplink signal lastly and stops transmitting the uplink signal. The base station device 100 recognizes an empty channel by carrier sense without using random back-off in the third time resource. That is, the base station device 100 recognizes that the radio resources from the third time resource to the end timing of the COT can be used.

The base station device 100 transmits a downlink signal by using the third to sixth time resources among the sharable resources. Further, by using the uplink grant, the base station device 100 instructs the second terminal device 200 to perform uplink transmission in the seventh and eighth time resources among the sharable resources. Then, the second terminal device 200 performs carrier sense without using random back-off, and then transmits an uplink signal by using the seventh and eighth time resources of the sharable resources.

Direct Sharing of Access Rights

The access rights may be shared directly. In that case, the first terminal device 200 transmits the sharable resource information to the second terminal device 200. Typically, the first terminal device 200 may transmit the sharable resource information to the second terminal device 200 on the sidelink. The transmission method to the second terminal device 200 is not limited to the sidelink. For example, the first terminal device 200 may transmit a reference signal for measuring interference between terminal devices while including sharable resource information. Thereafter, as described in section 3.2 (2), the second terminal device 200 transmits a signal on the basis of the received sharable resource information by using the sharable resources. In this case, the second terminal device 200 performs grant-free transmission. This point will be described with reference to FIG. 9.

Figure 9:
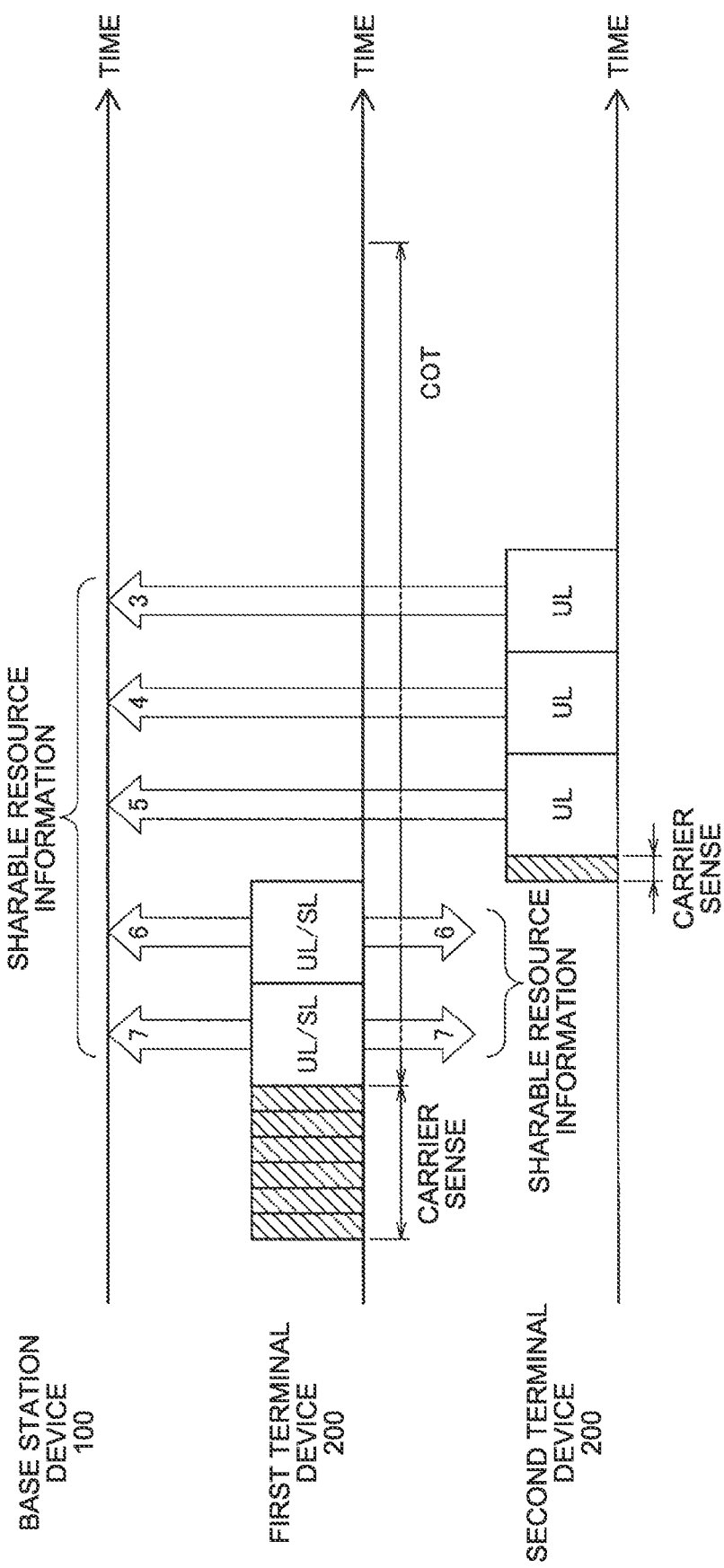
FIG. 9 is a diagram for describing still another example of sharing the access right according to this embodiment.

FIG. 9 is a diagram for describing an example of sharing the access right according to this embodiment. In the example illustrated in FIG. 9, the second terminal device 200 corresponds to a shared communication device. The upper part of FIG. 9 illustrates carrier sense performed by the base station device 100 and a signal transmitted by the base station device 100. The middle part of FIG. 9 illustrates carrier sense performed by the first terminal device 200 and a signal transmitted by the first terminal device 200. The lower part of FIG. 9 illustrates carrier sense performed by the second terminal device 200 and a signal transmitted by the second terminal device 200. The rectangle described as UL is a time resource for transmitting a downlink signal. The rectangle described as SL is a time resource for transmitting a sidelink signal.

As illustrated in FIG. 9, the first terminal device 200 first performs carrier sense using random back-off, and acquires an access right. Next, the first terminal device 200 transmits an uplink signal and a sidelink signal within the COT on the basis of the acquired access right. At this time, the first terminal device 200 performs uplink transmission and sidelink transmission of the sharable resource information in all time resources of the time resources used continuously. In the example illustrated in FIG. 9, as the sharable resource information, the information indicating the remaining time of the COT based on the time resource at which the sharable resource information is transmitted is transmitted. In the example illustrated in FIG. 9, the first terminal device 200 acquires access rights for eight time resources. Then, the first terminal device 200 performs uplink transmission and sidelink transmission of the sharable resource information indicating that access rights to the seven remaining time resources are acquired in the first time resource.

Thereafter, the first terminal device 200 performs uplink transmission and sidelink transmission of the sharable resource information indicating that access rights to the six remaining time resources are acquired in the second time resource. The second terminal device 200 can recognize the remaining time of the COT on the basis of the sharable resource information transmitted by the sidelink. The first terminal device 200 transmits the second uplink signal and the sidelink signal lastly and stops transmitting the uplink signal and the sidelink signal. The second terminal device 200 recognizes an empty channel by carrier sense without using random back-off in the third time resource. That is, the second terminal device 200 recognizes that the radio resources from the third time resource to the end timing of the COT can be used. Accordingly, as illustrated in FIG. 9, the second terminal device 200 can transmit the uplink signal by using the sharable resource. At this time, similarly to the first terminal device 200, the second terminal device 200 transmits the sharable resource information on the uplink. Accordingly, for example, after the second terminal device 200 ends the uplink transmission, the base station device 100 can transmit the downlink signal by using the sharable resource.

(2) Sharable Range of Access Rights Sharable

In a case where the degree of similarity of the communication environment with the first terminal device 200 exceeds a predetermined value, the second terminal device 200 (for example, the communication processing unit 243) transmits a signal on the basis of the sharable resource information by using the sharable resource. This is because it is considered that the higher the degree of similarity of the communication environment between the first terminal device 200 and the second, the more similar the carrier sense results. In other words, the higher the degree of similarity in the communication environment between the first terminal device 200 and the second terminal device 200, the higher the possibility that the signal transmitted on the basis of the access right has the same effect on the surroundings. By operating the terminal device 200 that satisfies this condition as the second terminal device 200, it is possible to prevent that unexpected interference is be given to surroundings when the second terminal device 200 transmits a signal by using the sharable resource.

The degree of similarity in the communication environment may be determined on the basis of the information indicating the distance between the terminal devices 200. For example, whether or not the degree of similarity of the communication environment exceeds a predetermined value can be determined on the basis of whether or not the path loss between the terminal devices 200 or the geographic distance between the terminal devices 200 is equal to or less than a predetermined value. This point will be described specifically with reference to FIG. 10.

Figure 10:
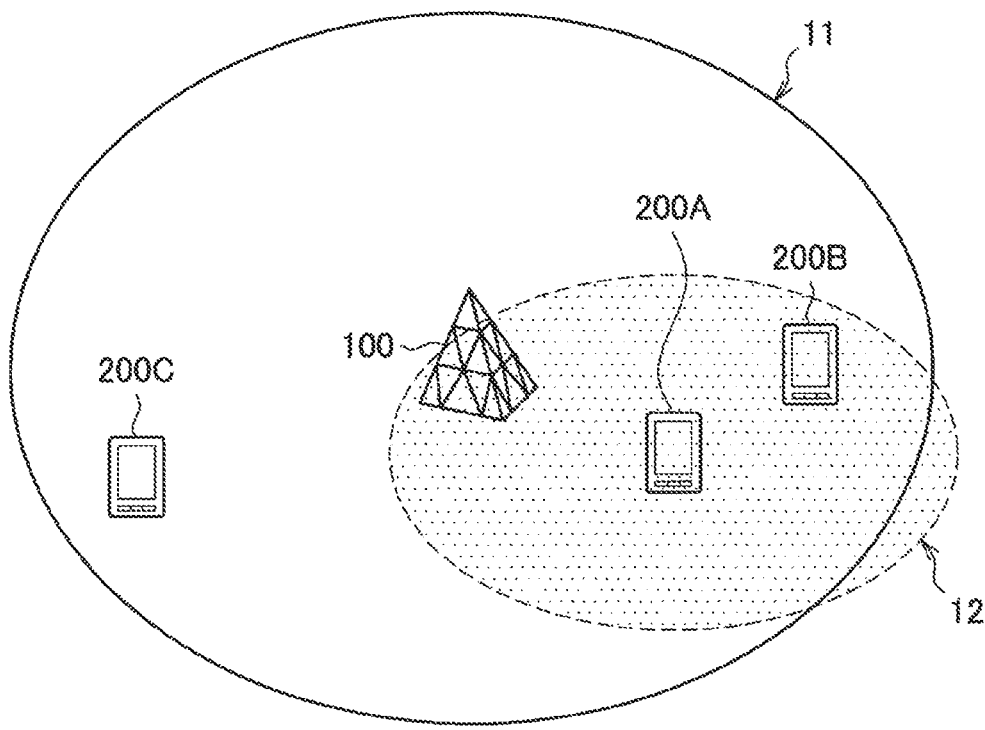
FIG. 10 is a diagram for describing sharing of an access right by a second terminal device according to this embodiment.

FIG. 10 is a diagram for describing sharing of the access right by the second terminal device 200 according to this embodiment. As illustrated in FIG. 10, terminal devices 200A, 200B, and 200C are located in cell 11 operated by the base station device 100, and each device is communicating with the base station device 100. There is a large possibility that the influence on the surroundings is similarly given between the terminal devices 200 with close transmission points. Therefore, it is desirable that a plurality of terminal devices 200 with close transmission points shares the access right. In the example illustrated in FIG. 10, it is assumed that the terminal device 200A functions as the first terminal device 200 and acquires the access right. The terminal device 200A can detect the signal transmitted from the communication device located within a carrier sense range 12 by carrier sense. Incidentally, the carrier sense range 12 is a range capable of giving an influence (that is, interference) when the terminal device 200A transmits a signal, and is expanded/contracted according to transmission power assumed to be used when the terminal device 200A transmits a signal. The terminal device 200B is located within the carrier sense range 12, and thus the influence on the surroundings is likely to be the same as that of the terminal device 200A. Therefore, it is desirable that the terminal device 200B functions as the second terminal device 200 and shares the access right acquired by the terminal device 200A. On the other hand, the terminal device 200C is located outside the carrier sense range 12, and thus the influence on the surroundings is likely to be different from that of the terminal device 200A. Therefore, it is desirable that the terminal device 200C does not share the access right acquired by the terminal device 200A.

The degree of similarity in the communication environment may be determined on the basis of the information on the interference situation. For example, whether or not the degree of similarity in the communication environment exceeds a predetermined value can be determined on the basis of whether or not a difference in a received signal strength indicator (RSSI) or the degree of channel congestion between the terminal devices 200 is equal to or smaller than a predetermined value.

The degree of similarity in the communication environment may be determined on the basis of the information about the transmission destination. For example, whether or not the degree of similarity in the communication environment exceeds a predetermined value can be determined on the basis of whether or not a difference in the direction of the transmission destination or the direction of the beam between the terminal devices 200 is equal to or smaller than a predetermined value. Incidentally, this index is particularly useful when carrier sense using a beam form is performed.

The plurality of terminal devices 200 that can share the access right may be grouped. The grouping is performed on the basis of, for example, the degree of similarity in the communication environment described above. The grouping is typically performed by the base station device 100 (for example, the access right sharing unit 151). Then, each terminal device 200 is set from the base station device 100 with the information indicating the group to which the terminal device belongs.

(3) Sharable Resource Information

In the following, regarding the sharing of the access right by the second terminal device 200, the information that may be included in the sharable resource information will be described.

Information on Communication Environment

The sharable resource information may include the information on the communication environment described above. Accordingly, the second terminal device 200 can calculate the degree of similarity in the communication environment with the first terminal device 200 on the basis of the received sharable resource information and determine whether or not the access right can be shared.

For example, the sharable resource information may include the information indicating the geographical position or transmission power of the first terminal device 200. Accordingly, the second terminal device 200 can determine the degree of similarity in the communication environment on the basis of the information indicating the distance between the terminal devices 200.

For example, the sharable resource information may include information indicating the RSSI of the first terminal device 200 or the degree of channel congestion. Accordingly, the second terminal device 200 can determine the degree of similarity in the communication environment on the basis of the information on the interference situation.

For example, the sharable resource information may include the information indicating the transmission-destination direction or the beam direction of the first terminal device 200. Accordingly, the second terminal device 200 can determine the degree of similarity in the communication environment on the basis of the information regarding the transmission destination.

Group Information

The sharable resource information may include the information indicating the group that can share the access right. The information indicating the group that can share the access right may include the identification information such as the ID and C-RNTI of each of the plurality of terminal devices 200 that can share the access right, the ID of the group, and the like. With reference to the information which is included in the received sharable resource information and indicates the group that can share the access right, the second terminal device 200 can determine whether or not the access right can be shared on the basis of the received sharable resource information.

For example, the first terminal device 200 transmits the information indicating the group to which the first terminal device 200 belongs while being included in the sharable resource information. If the group to which the first terminal device 200 belongs is the same as that of the second terminal device 200, the second terminal device 200 determines that the access right acquired by the first terminal device 200 can be shared.

(4) Communication Parameter

The first terminal device 200 and the second terminal device 200 share communication parameters to be used in the sharable resources.

The first terminal device 200 and the second terminal device 200 may directly share the communication parameters to be used in the sharable resources by D2D communication. Alternatively, the first terminal device 200 and the second terminal device 200 may indirectly share the communication parameters to be used in the sharable resources via the base station device 100. In addition, the base station device 100 may determine the communication parameters to be used in the sharable resources and transmit the communication parameters to each terminal device 200.

An example of information that can be included in the communication parameters will be described below.

Upper Limit of Transmission Power

The communication parameter to be used in the sharable resource may include the information indicating the upper limit of the transmission power that can be used by the second terminal device 200 in the sharable resource.

The second terminal device 200 (for example, the communication processing unit 243) transmits a signal with transmission power equal to or less than the transmission power assumed in the carrier sense performed when the first terminal device 200 acquires the access right. For example, in the example illustrated in FIG. 10, the terminal device 200B transmits a signal in the sharable resource by using transmission power equal to or less than transmission power assumed in carrier sense performed when the terminal device 200A acquires the access right. Accordingly, it is possible to prevent unexpected interference from occurring when the second terminal device 200 transmits a signal in the sharable resource.

Parameters for Channel Access

The communication parameters to be used in the sharable resource may include parameters for channel access.

It is desirable that the first terminal device 200 and the second terminal device 200 use the parameters of the same channel access. When at least a part of the parameters for channel access is updated, it is desirable that the updated parameters for channel access be shared.

The parameters for channel access include the size of the contention window and the threshold for carrier sense. Further, the parameters for channel access include a maximum transmission power, an antenna gain, and a beam gain.

(5) Supplement

The second terminal device 200 may be plural. In that case, the plurality of second terminal devices 200 uses the sharable resources in order, for example. In a case where the plurality of second terminal devices 200 supports non-orthogonal multiple access (NOMA) communication, signal may be non-orthogonal (NOMA) multiplexed in the same sharable resource to be transmitted.

In a case where the first terminal device 200 and the second terminal device 200 support NOMA communication, signals may be non-orthogonal multiplexed in the same radio resource to be transmitted. In this case, the second terminal device 200 can transmit the signal without waiting for the first terminal device 200 to end using the radio resource.

<3.6. Processing Flow>

(1) Process Flow by First Terminal Device 200

Figure 11:
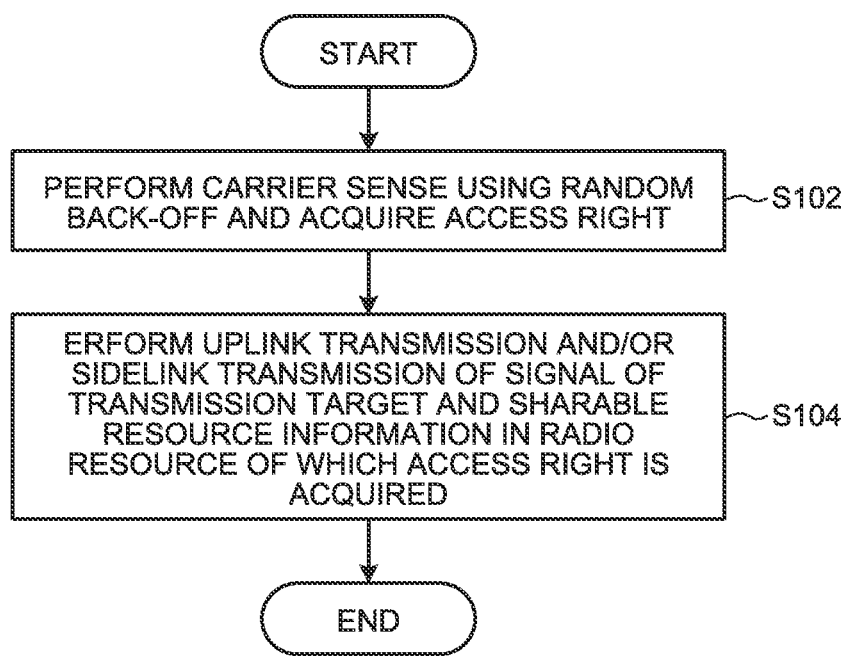
FIG. 11 is a flowchart illustrating an example of a flow of an access right sharing process executed by a first terminal device according to this embodiment.

FIG. 11 is a flowchart illustrating an example of a flow of an access right sharing process executed by the first terminal device 200 according to this embodiment.

As illustrated in FIG. 11, first, the communication processing unit 243 performs carrier sense using random back-off, and acquires an access right (Step S102). Next, the access right sharing unit 241 performs uplink transmission and/or sidelink transmission of the signal of the transmission target and the sharable resource information in the radio resource of which the access right is acquired (Step S104).

(2) Flow of Process by Base Station Device 100

Figure 12:
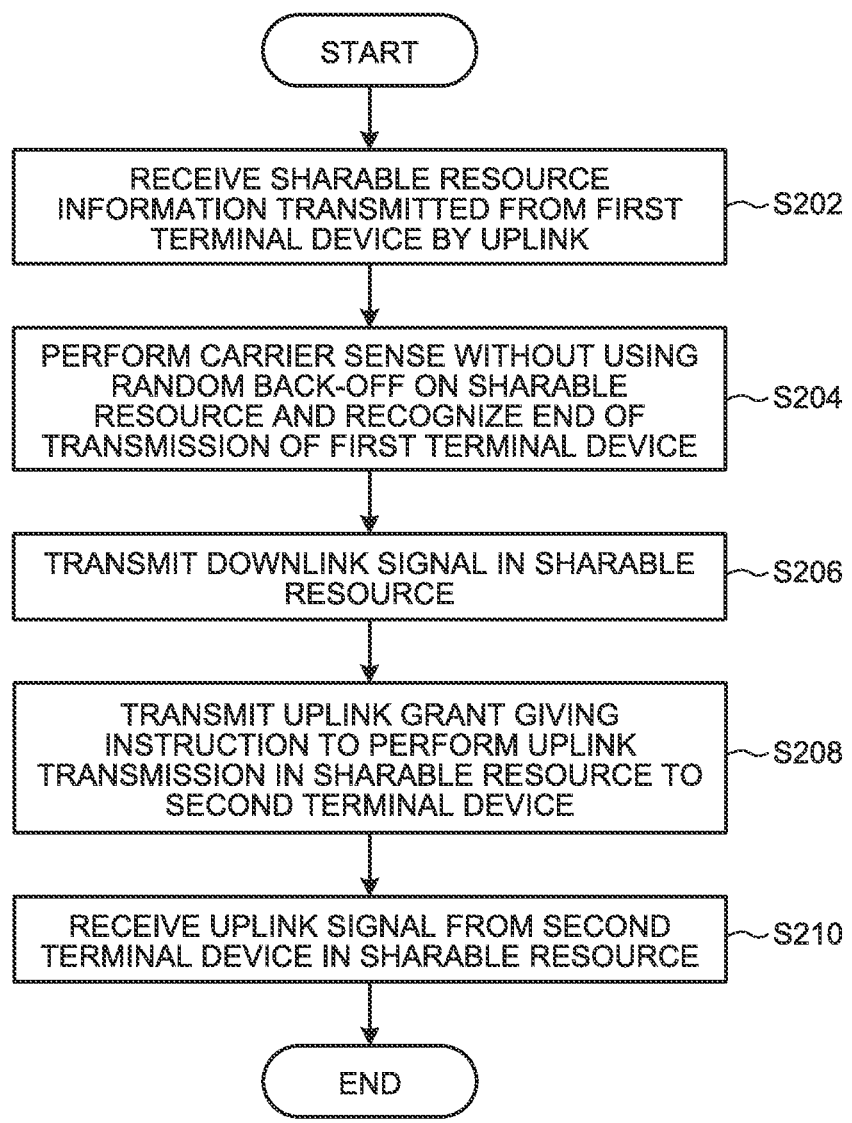
FIG. 12 is a flowchart illustrating an example of a flow of an access right sharing process executed by the base station device according to this embodiment.

FIG. 12 is a flowchart illustrating an example of a flow of an access right sharing process performed by the base station device 100 according to this embodiment.

As illustrated in FIG. 12, first, the access right sharing unit 151 receives the sharable resource information transmitted from the first terminal device 200 by the uplink (Step S202). Next, the communication processing unit 153 performs carrier sense without using random back-off on the sharable resource, and recognizes the end of transmission of the first terminal device 200 (Step S204). Next, the communication processing unit 153 transmits a downlink signal in the sharable resource (Step S206). Next, the access right sharing unit 151 transmits an uplink grant instructing to perform uplink transmission in the sharable resource to the second terminal device 200 (Step S208). Then, the communication processing unit 153 receives the uplink signal from the second terminal device 200 in the sharable resource (Step S210).

Incidentally, Steps S206 and S208 described above may be performed simultaneously, or the order may be reversed.

(3) Flow of Process by Second Terminal Device 200

Figure 13:
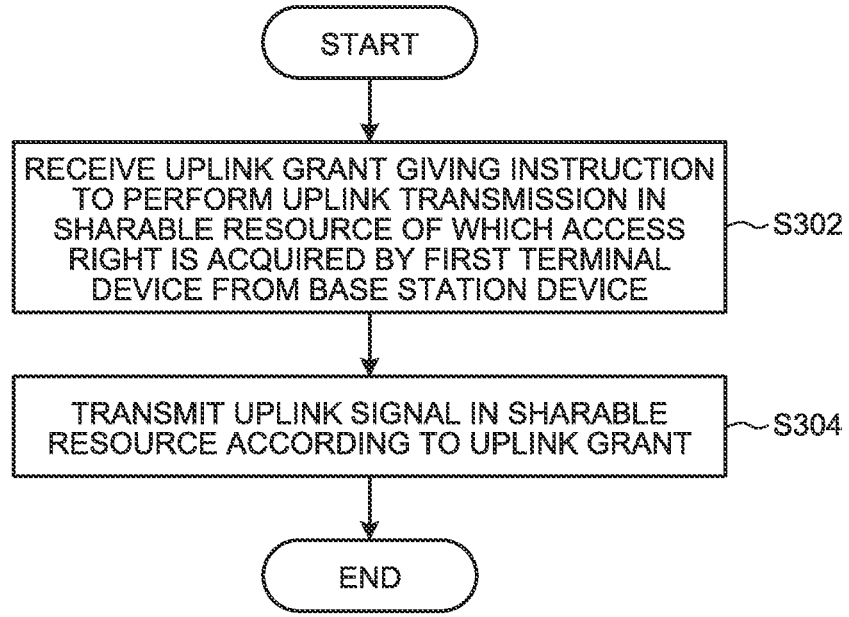
FIG. 13 is a flowchart illustrating an example of a flow of an access right sharing process executed by the second terminal device according to this embodiment.

FIG. 13 is a flowchart illustrating an example of a flow of the access right sharing process executed by the second terminal device 200 according to this embodiment. This flow illustrates an example in a case where the access right is shared via the base station device 100 as described above with reference to FIG. 8.

As illustrated in FIG. 13, first, the access right sharing unit 241 gives an instruction to perform uplink transmission in the sharable resource of which the access right is acquired by the first terminal device 200.

The uplink grant is received from the base station device 100 (Step S302). Then, the communication processing unit 243 transmits an uplink signal in the sharable resource according to the uplink grant (Step S304).

Figure 14:
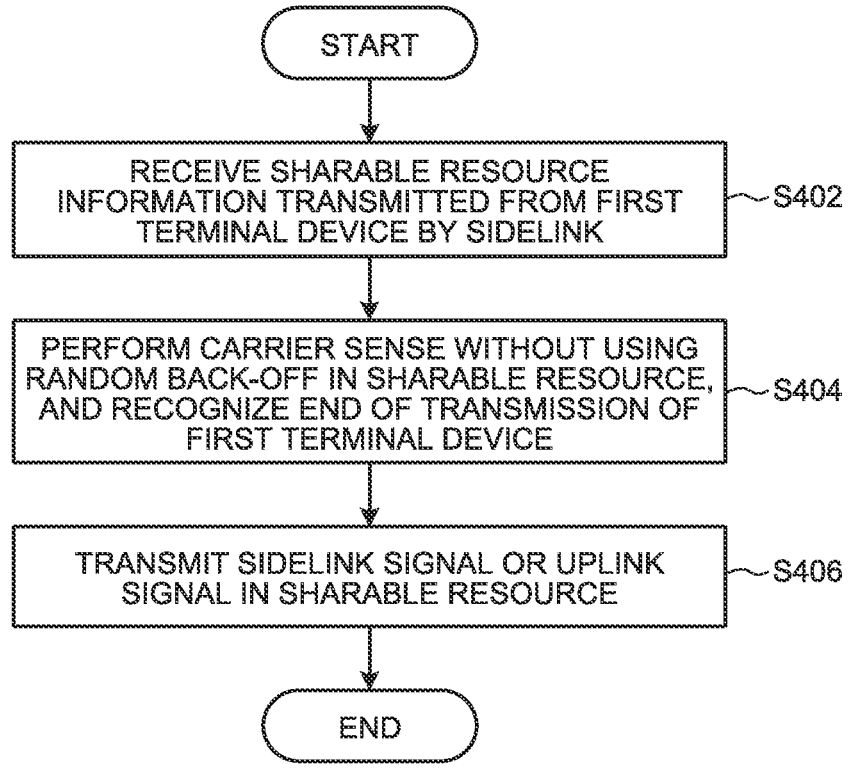
FIG. 14 is a flowchart illustrating an example of the flow of the access right sharing process executed by the second terminal device according to this embodiment.

FIG. 14 is a flowchart illustrating an example of the flow of the access right sharing process performed by the second terminal device 200 according to this embodiment. This flow illustrates an example in a case where the access right is directly shared as described above with reference to FIG. 9.

As illustrated in FIG. 14, first, the access right sharing unit 241 receives the sharable resource information transmitted from the first terminal device 200 by the sidelink (Step S402). Next, the communication processing unit 243 performs carrier sense without using random back-off in the sharable resource, and recognizes the end of transmission of the first terminal device 200 (Step S404). Then, the communication processing unit 243 transmits a sidelink signal or an uplink signal in the sharable resource (Step S406).

4. Application Examples

The technology according to the present disclosure can be applied to various products. For example, the base station device 100 may be realized as any type of evolved Node B (eNB) such as a macro eNB or a small eNB. The small eNB may be an eNB that covers a cell, such as a pico eNB, a micro eNB, or a home (femto) eNB, smaller than a macro cell. Instead, the base station device 100 may be realized as another type of base station such as a NodeB or a base transceiver station (BTS). The base station device 100 may include a main entity (also referred to as a base station device) that controls wireless communication and one or more remote radio heads (RRHs) disposed at different locations from the main entity. Further, various types of terminals to be described below may operate as the base station device 100 by performing a base station function temporarily or semi-permanently.

For example, the terminal device 200 may be realized as a mobile terminal such as a smartphone, a tablet personal computer (PC), a notebook PC, a portable game terminal, a portable/dongle mobile router or a digital camera, or an in-vehicle terminal such as a car navigation device. Further, the terminal device 200 may be realized as a terminal that performs machine to machine (M2M) communication (also referred to as a machine type communication (MTC) terminal). Moreover, the terminal device 200 may be a wireless communication module (for example, an integrated circuit module configured on one die) mounted on these terminals.

<4.1. Application Example of Base Station Device>

First Application Example

Figure 15:
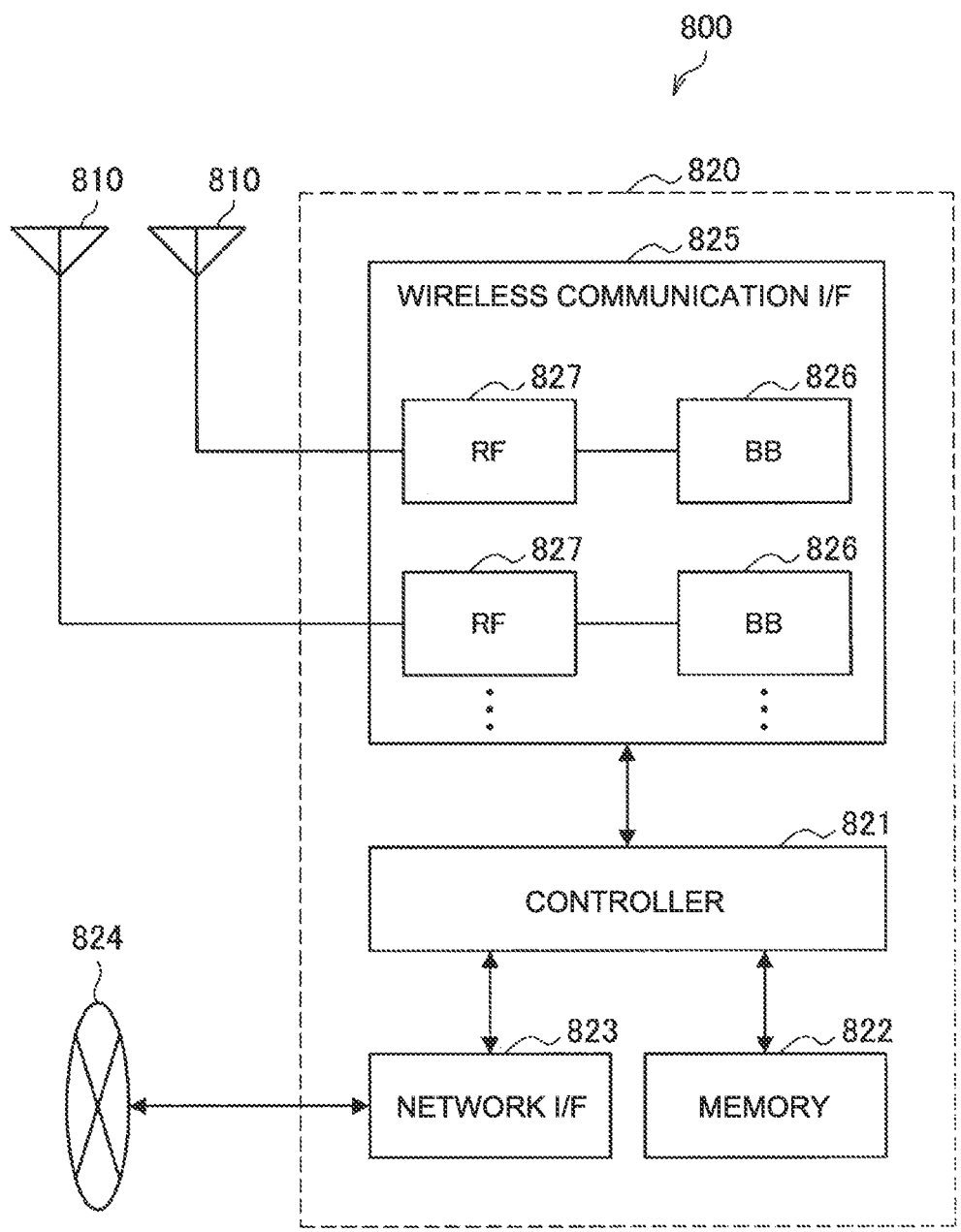
FIG. 15 is a block diagram illustrating a first example of a schematic configuration of an eNB.

FIG. 15 is a block diagram illustrating a first example of a schematic configuration of an eNB to which the technology according to the present disclosure may be applied. An eNB 800 includes one or more antennas 810 and a base station device 820. Each antenna 810 and the base station device 820 may be connected to each other via an RF cable.

Each of the antennas 810 includes a single or a plurality of antenna elements (for example, a plurality of antenna elements constituting a MIMO antenna) and is used for the base station device 820 to transmit and receive a wireless signal. The eNB 800 may include a plurality of the antennas 810 as illustrated in FIG. 15, and the plurality of antennas 810 may correspond to, for example, a plurality of frequency bands used by the eNB 800, respectively. Incidentally, although FIG. 15 illustrates an example in which the eNB 800 includes the plurality of antennas 810, the eNB 800 may include the single antenna 810.

The base station device 820 includes a controller 821, a memory 822, a network interface 823, and a wireless communication interface 825.

The controller 821 may be, for example, a CPU or a DSP, and operates various functions of an upper layer of the base station device 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as terminal list, transmission power data, and scheduling data).

The network interface 823 is a communication interface for connecting the base station device 820 to the core network 824. The controller 821 may communicate with a core network node or another eNB via the network interface 823. In this case, the eNB 800 may be connected to a core network node or another eNB through a logical interface (for example, S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (for example, L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station device 820, or a chip mounted on the card or the blade. On the other hand, the RF circuit 827 may include a mixer, a filter, an amplifier, and the like, and transmits and receives a wireless signal via the antenna 810.

The wireless communication interface 825 includes a plurality of BB processors 826 as illustrated in FIG. 15, and the plurality of BB processors 826 may correspond to a plurality of frequency bands used by the eNB 800, for example. Further, the wireless communication interface 825 may also include a plurality of the RF circuits 827, as illustrated in FIG. 15, and the plurality of RF circuits 827 may, for example, correspond to a plurality of antenna elements, respectively. Note that FIG. 15 illustrates an example in which the wireless communication interface 825 includes a plurality of BB processors 826 and a plurality of RF circuits 827, but the wireless communication interface 825 may include a single BB processor 826 or a single RF circuit 827.

In the eNB 800 illustrated in FIG. 15, one or more components (the access right sharing unit 151 and/or the communication processing unit 153) included in the control unit 150 described with reference to FIG. 4 may be implemented in the wireless communication interface 825. Alternatively, at least some of these components may be implemented in the controller 821. As an example, the eNB 800 may be implemented with a module including a part (for example, the BB processor 826) or all of the wireless communication interface 825, and/or the controller 821, and the module may be mounted with one or more of the components. In this case, the module may store a program for causing the processor to function as the one or more components (in other words, a program for causing the processor to execute the operations of the one or more components) and execute the program. As another example, a program for causing the processor to function as the one or more components may be installed in the eNB 800, and the wireless communication interface 825 (for example, the BB processor 826) and/or the controller 821 may execute the program. As described above, the eNB 800, the base station device 820, or the module may be provided as a device including the one or more components, and a program for causing the processor to function as the one or more components may be provided. Further, a readable recording medium on which the above-described program is recorded may be provided.

In the eNB 800 illustrated in FIG. 15, the wireless communication unit 120 described with reference to FIG. 4 may be implemented in the wireless communication interface 825 (for example, the RF circuit 827). Further, the antenna unit 110 may be implemented in the antenna 810. Further, the network communication unit 130 may be implemented in the controller 821 and/or the network interface 823. Further, the storage unit 140 may be implemented in the memory 822.

Second Application Example

Figure 16:
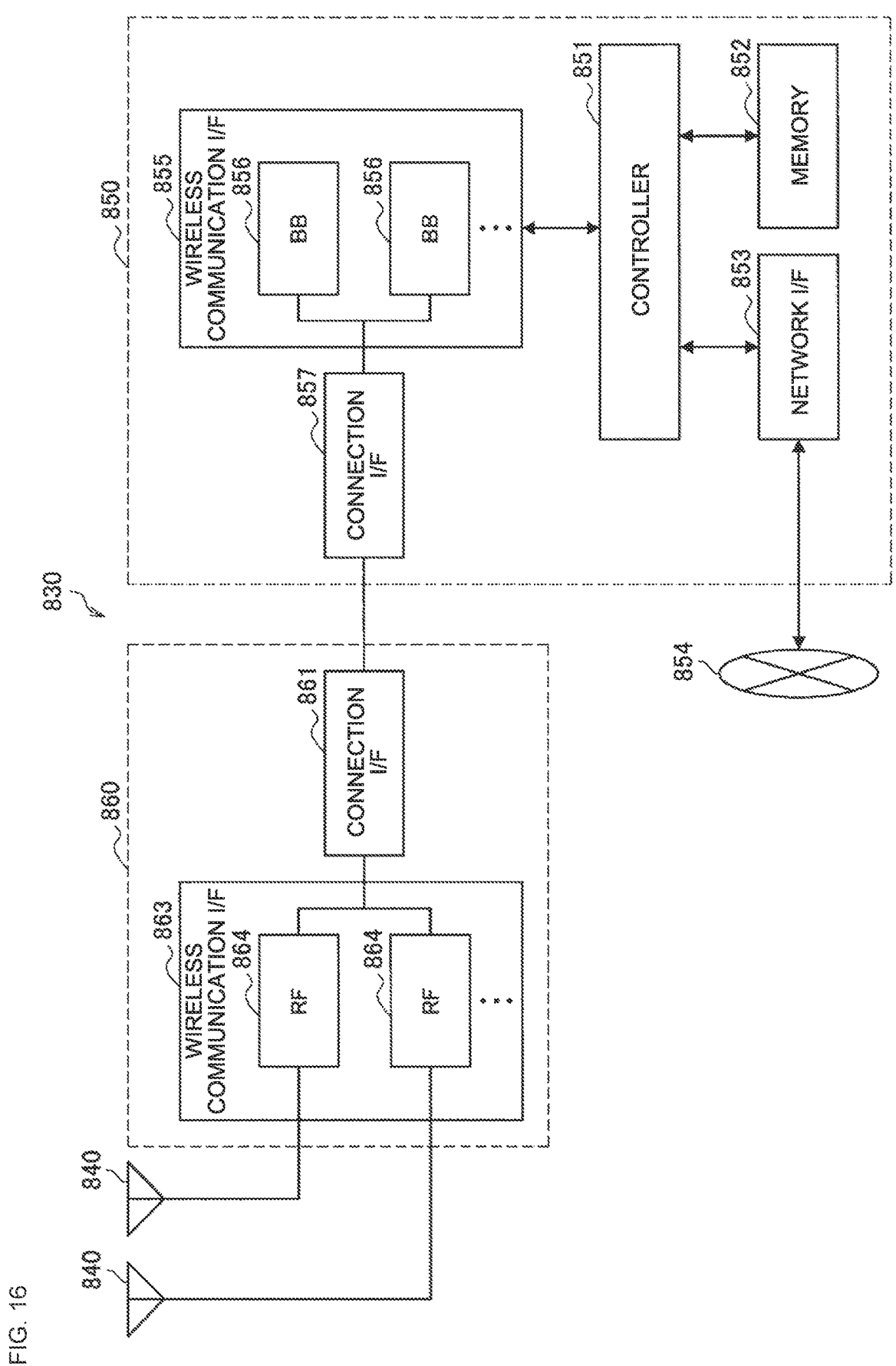
FIG. 16 is a block diagram illustrating a second example of a schematic configuration of the eNB.

FIG. 16 is a block diagram illustrating a second example of a schematic configuration of an eNB to which the technology according to the present disclosure may be applied. An eNB 830 includes one or more antennas 840, a base station device 850, and an RRH 860. Each of the antennas 840 and the RRH 860 may be connected to each other via an RF cable. Further, the base station device 850 and the RRH 860 may be connected to each other by a high speed line such as optical fiber cables.

Each of the antennas 840 includes a single or a plurality of antenna elements (for example, a plurality of antenna elements constituting a MIMO antenna), and is used for the RRH 860 to transmit and receive a wireless signal. The eNB 830 may include a plurality of the antennas 840 as illustrated in FIG. 16, and the plurality of antennas 840 may correspond to, for example, a plurality of frequency bands used by the eNB 830, respectively. Incidentally, although FIG. 16 illustrates an example in which the eNB 830 includes the plurality of antennas 840, the eNB 830 may include the single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 15.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 15 except that the BB processor 856 is connected to an RF circuit 864 of the RRH 860 via the connection interface 857. The wireless communication interface 855 may include a plurality of the BB processors 856 as illustrated in FIG. 16, and the plurality of BB processors 856 may correspond to, for example, a plurality of frequency bands used by the eNB 830, respectively. Note that FIG. 16 illustrates an example in which the wireless communication interface 855 includes the plurality of BB processors 856, but the wireless communication interface 855 may include the single BB processor 856.

The connection interface 857 is an interface for connecting the base station device 850 (wireless communication interface 855) to the RRH 860. The connection interface 857 may be a communication module for communication on the high speed line which connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier, and the like, and transmits and receives a wireless signal via the antenna 840. The wireless communication interface 863 may include a plurality of the RF circuits 864 as illustrated in FIG. 16, and the plurality of RF circuits 864 may, for example, correspond to a plurality of antenna elements, respectively. Note that FIG. 16 illustrates an example in which the wireless communication interface 863 includes the plurality of RF circuits 864, but the wireless communication interface 863 may include the single RF circuit 864.

In the eNB 830 illustrated in FIG. 16, one or more components (the access right sharing unit 151 and/or the communication processing unit 153) included in the control unit 150 described with reference to FIG. 4 may be implemented in the wireless communication interface 855 and/or the wireless communication interface 863. Alternatively, at least some of these components may be implemented in the controller 851. As an example, the eNB 830 may be mounted with a module including a part (for example, the BB processor 856) or all of the wireless communication interface 855 and/or the controller 851, and the module may be implemented with one or more of the components. In this case, the module may store a program for causing the processor to function as the one or more components (in other words, a program for causing the processor to execute the operations of the one or more components) and execute the program. As another example, a program for causing the processor to function as the one or more components may be installed in the eNB 830, and the wireless communication interface 855 (for example, the BB processor 856) and/or the controller 851 may execute the program. As described above, the eNB 830, the base station device 850, or the module may be provided as a device including the one or more components, and a program for causing the processor to function as the one or more components may be provided. Further, a readable recording medium on which the above-described program is recorded may be provided.

In the eNB 830 illustrated in FIG. 16, for example, the wireless communication unit 120 described with reference to FIG. 4 may be implemented in the wireless communication interface 863 (for example, the RF circuit 864). Further, the antenna unit 110 may be implemented in the antenna 840. Further, the network communication unit 130 may be implemented in the controller 851 and/or the network interface 853. Further, the storage unit 140 may be implemented in the memory 852.

<4.2. Application Example of Terminal Device>

First Application Example

Figure 17:
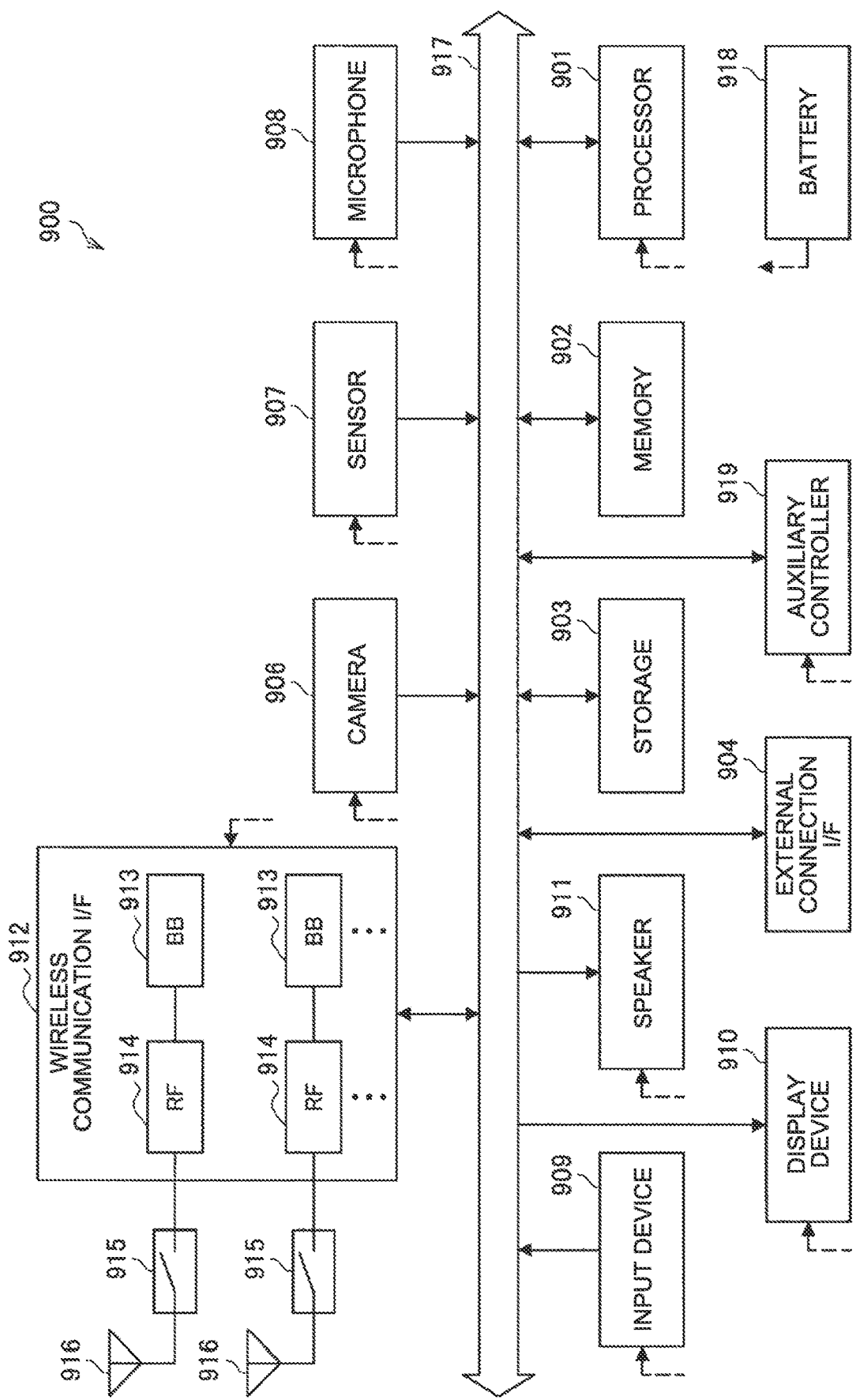
FIG. 17 is a block diagram illustrating an example of a schematic configuration of a smartphone.

FIG. 17 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting an externally attached device such as memory cards and universal serial bus (USB) devices to the smartphone 900.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor, and the like. The microphone 908 converts a sound that is input into the smartphone 900 to an audio signal. The input device 909 includes, for example, a touch sensor which detects that a screen of the display device 910 is touched, a key pad, a keyboard, a button, a switch, or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include BB processor 913, RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 17. Note that FIG. 17 illustrates an example in which the wireless communication interface 912 includes a plurality of BB processors 913 and a plurality of RF circuits 914, but the wireless communication interface 912 may include a single BB processor 913 or a single RF circuit 914.

The wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 17. Note that FIG. 17 illustrates an example in which the smartphone 900 includes a plurality of antennas 916, but the smartphone 900 may include a single antenna 916.

The smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 17 via a feeder line that is partially indicated by a broken line in the drawing. The auxiliary controller 919, for example, operates a minimally necessary function of the smartphone 900 in a sleep mode.

In the smartphone 900 illustrated in FIG. 17, one or more components (the access right sharing unit 241 and/or the communication processing unit 243) included in the control unit 240 described with reference to FIG. 5 may be implemented in the wireless communication interface 912. Alternatively, at least some of these components may be implemented in the processor 901 or the auxiliary controller 919. As an example, the smartphone 900 may be mounted with a module including a part (for example, the BB processor 913) or all of the wireless communication interface 912, the processor 901 and/or the auxiliary controller 919, and the module may be implemented with one or more of the components. In this case, the module may store a program for causing the processor to function as the one or more components (in other words, a program for causing the processor to execute the operations of the one or more components) and execute the program. As another example, a program for causing the processor to function as the one or more components may be installed in the smartphone 900, and the wireless communication interface 912 (for example, the BB processor 913), the processor 901, and/or the auxiliary controller 919 may execute the program. As described above, the smartphone 900 or the module may be provided as a device including the one or more components, and a program for causing the processor to function as the one or more components may be provided. Further, a readable recording medium on which the above-described program is recorded may be provided.

In the smartphone 900 illustrated in FIG. 17, for example, the wireless communication unit 220 described with reference to FIG. 5 may be implemented in the wireless communication interface 912 (for example, the RF circuit 914). Further, the antenna unit 210 may be implemented in the antenna 916. Further, the storage unit 230 may be implemented in the memory 902.

Second Application Example

Figure 18:
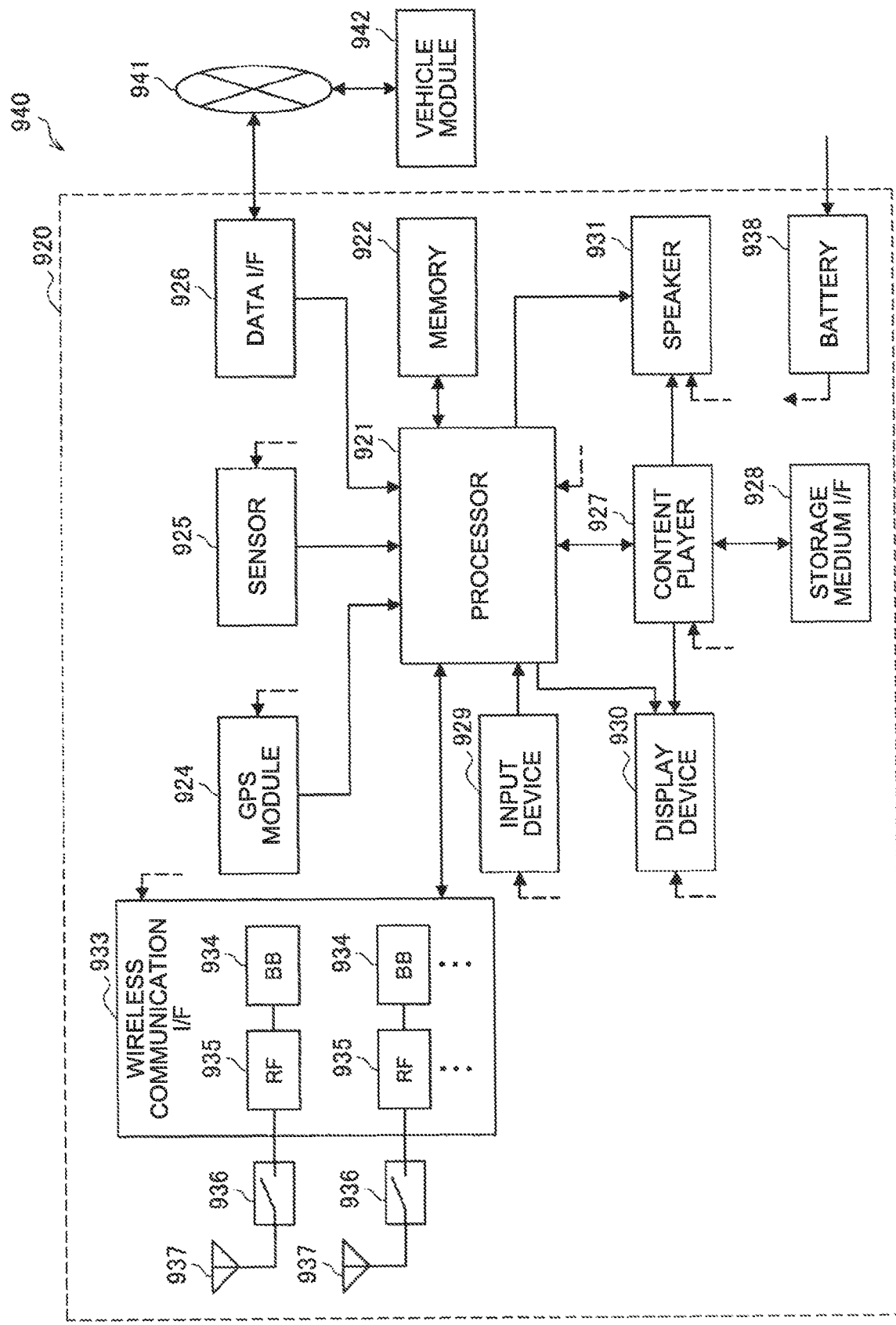
FIG. 18 is a block diagram illustrating an example of a schematic configuration of a car navigation device.

FIG. 18 is a block diagram illustrating an example of a schematic configuration of a car navigation device 920 to which the technology according to the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation device 920. The memory 922 includes a RAM and a ROM, and stores a program executed by the processor 921 and data.

The GPS module 924 uses a GPS signal received from a GPS satellite to measure the position (for example, latitude, longitude, and altitude) of the car navigation device 920. The sensor 925 may include a sensor group including, for example, a gyro sensor, a geomagnetic sensor, and a barometric sensor. The data interface 926 is, for example, connected to an in-vehicle network 941 via a terminal that is not illustrated, and acquires data such as vehicle speed data generated on the vehicle side.

The content player 927 reproduces content stored in a storage medium (for example, CD or DVD) inserted into the storage medium interface 928. The input device 929 includes, for example, a touch sensor which detects that a screen of the display device 930 is touched, a button, a switch, or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include a BB processor 934, an RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 18. Note that FIG. 18 illustrates an example in which the wireless communication interface 933 includes a plurality of BB processors 934 and a plurality of RF circuits 935, but the wireless communication interface 933 may include a single BB processor 934 or a single RF circuit 935.

The wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation device 920 may include a plurality of antennas 937 as illustrated in FIG. 18. Note that FIG. 18 illustrates an example in which the car navigation device 920 includes a plurality of antennas 937, but the car navigation device 920 may include a single antenna 937.

The car navigation device 920 may include the antenna 937 for each wireless communication system. In this case, the antenna switch 936 may be omitted from a configuration of the car navigation device 920.

The battery 938 supplies electric power to each block of the car navigation device 920 illustrated in FIG. 18 via a feeder line that is partially indicated by a broken line in the drawing. Further, the battery 938 accumulates the electric power supplied from the vehicle.

In the car navigation device 920 illustrated in FIG. 18, one or more components (the access right sharing unit 241 and/or the communication processing unit 243) included in the control unit 240 described with reference to FIG. 5 may be implemented in the wireless communication interface 933. Alternatively, at least some of these components may be implemented in the processor 921. As an example, the car navigation device 920 may be mounted with a module including a part (for example, the BB processor 934) or all of the wireless communication interface 933 and/or the processor 921, and the module may be implemented with one or more of the components. In this case, the module may store a program for causing the processor to function as the one or more components (in other words, a program for causing the processor to execute the operations of the one or more components) and execute the program. As another example, a program for causing the processor to function as the one or more components may be installed in the car navigation device 920, and the wireless communication interface 933 (for example, the BB processor 934) and/or the processor 921 may execute the program. As described above, the car navigation device 920 or the module may be provided as a device including the one or more components, and a program for causing the processor to function as the one or more components may be provided. Further, a readable recording medium on which the above-described program is recorded may be provided.

In the car navigation device 920 illustrated in FIG. 18, for example, the wireless communication unit 220 described with reference to FIG. 5 may be implemented in the wireless communication interface 933 (for example, the RF circuit 935). Further, the antenna unit 210 may be implemented in the antenna 937. Further, the storage unit 230 may be implemented in the memory 922.

The technology of the present disclosure may also be realized as an in-vehicle system (or a vehicle) 940 including one or more blocks of the above-described car navigation device 920, the in-vehicle network 941, and a vehicle module 942. The vehicle module 942 generates vehicle data such as vehicle speed, engine speed, and trouble information, and outputs the generated data to the in-vehicle network 941.

5. Conclusion

The embodiment of the present disclosure has been described above in detail with reference to FIGS. 1, 2, 3A, 3B, 3C, 4, 5, 6, 7, 8, 9, 10, 11, 12, 13, 14, 15, 16, 17, and 18. As described above, the first terminal device 200 according to this embodiment transmits the sharable resource information, which indicates the radio resource available to another communication device among the radio resources of which the access rights are acquired by performing carrier sense using random back-off, on the uplink or the sidelink. Accordingly, the another communication device can transmit a signal by sharing the access right acquired by the first terminal device 200. Here, the access right is already acquired by the first terminal device 200, and thus the another communication device performs channel access without performing carrier sense using random back-off. Therefore, compared to a case where the carrier sense using random back-off is performed, the waiting time for channel access is reduced, and the use efficiency of radio resources can be improved.

The preferred embodiments of the present disclosure have been described above in detail with reference to the accompanying drawings, but the technical scope of the present disclosure is not limited to such examples. It is obvious that a person with ordinary knowledge in the art to which the present disclosure pertains can come up with various changes or modifications within the scope of the technical idea described in the claims. Of course, it is understood that they belong to the technical scope of the present disclosure.

Further, the processes described with reference to the flowcharts and the sequence diagrams in this specification do not necessarily have to be executed in the illustrated order. Some processing Steps may be performed in parallel. Further, additional processing Steps may be employed, and some processing Steps may be omitted.

Further, the effects described in this specification are merely illustrative or exemplary and are not limited. That is, the technology according to the present disclosure can exhibit other effects that are apparent to those skilled in the art from the description of this specification in addition to or instead of the above effects.

Note that the following configurations also belong to the technical scope of the present disclosure.

(1)
A terminal device comprising:
a control unit configured to transmit first resource information, which indicates a radio resource available to another communication device among radio resources of which access rights are acquired by performing carrier sense, on an uplink or a sidelink.

(2)
The terminal device according to claim (1), wherein the first resource information includes information indicating a radio resource of which an access right is acquired by the terminal device.

(3)
The terminal device according to claim (2), wherein the first resource information includes information indicating an interval from a time resource in which the first resource information is transmitted to a last time resource of a radio resource of which an access right is acquired by the terminal device.

(4)
The terminal device according to claim (2) or (3), wherein the first resource information includes information indicating a last time resource of a radio resource of which an access right is acquired by the terminal device.

(5)
The terminal device according to any one of claims (2)~(4), wherein the first resource information includes information indicating a first time resource of a radio resource of which an access right is acquired by the terminal device.

(6)
The terminal device according to any one of claims (2)~(5), wherein the first resource information includes information indicating a channel access priority class of a radio resource of which an access right is acquired by the terminal device.

(7)
The terminal device according to any one of claims (2)~(6), wherein the first resource information includes information indicating a radio resource to be used by the terminal device among radio resources of which access rights are acquired by the terminal device.

(8)
The terminal device according to any one of claims (1)~(7), wherein the control unit transmits the first resource information in a part of time resources used continuously.

(9)
The terminal device according to any one of claims (1)~(7), wherein the control unit transmits the first resource information in all of time resources used continuously.

(10)
The terminal device according to any one of claims (1)~(9), wherein the control unit transmits the first resource information by using a physical channel different from a physical channel used for data transmission.

(11)
The terminal device according to any one of claims (1)~(10), wherein the control unit transmits the first resource information by using a physical channel that is able to be commonly received by different operators.

(12)
The terminal device according to any one of claims (1)~(11), wherein in a case where the control unit receives second resource information which indicates, among radio resources of which access rights are acquired by another terminal device by performing carrier sense, a radio resource available to another communication device other than the another terminal device, the control unit transmits a signal by using the radio resource available to the another communication device.

(13)
The terminal device according to claim (12), wherein a type of a signal transmittable by using a radio resource available to the another communication device is limited.

(14)
The terminal device according to claim (12) or (13), wherein the control unit transmits a signal with transmission power equal to or less than transmission power assumed in carrier sense performed when the another terminal device acquires an access right.

(15)
The terminal device according to any one of claims (12)~(14), wherein the control unit transmits a signal by using resources available to the another communication device in a case where a degree of similarity in a communication environment with the another terminal device exceeds a predetermined value.

(16)
The terminal device according to claim (15), wherein the second resource information includes information on a communication environment.

(17)
A base station device comprising:
a control unit configured to receive resource information which indicates, among radio resources of which access rights are acquired by a terminal device by performing carrier sense, a resource available to another communication device other than the terminal device from the terminal device and use the resource available to the another communication device for communication.

(18)

The base station device according to claim (17), wherein the control unit transmits a signal on the basis of the resource information by using a radio resource available to the another communication device.

(19)

The base station device according to claim (17), wherein the control unit transmits a grant message giving an instruction on transmission of a signal in a radio resource available to the another communication device to another terminal device other than the terminal device on the basis of the resource information.

(20)

A method performed by a processor, comprising:
transmitting first resource information, which indicates a radio resource available to another communication device among radio resources of which access rights are acquired by performing carrier sense, on an uplink or a sidelink.

REFERENCE SIGNS LIST

1 SYSTEM
11 CELL
12 CARRIER SENSE RANGE
20 CORE NETWORK
30 PDN
100 BASE STATION DEVICE
110 ANTENNA UNIT
120 WIRELESS COMMUNICATION UNIT
130 NETWORK COMMUNICATION UNIT
140 STORAGE UNIT
150 CONTROL UNIT
151 ACCESS RIGHT SHARING UNIT
153 COMMUNICATION PROCESSING UNIT
200 TERMINAL DEVICE
210 ANTENNA UNIT
220 WIRELESS COMMUNICATION UNIT
230 STORAGE UNIT
240 CONTROL UNIT
241 ACCESS RIGHT SHARING UNIT
243 COMMUNICATION PROCESSING UNIT

The invention claimed is:

1. A base station device, comprising:
a radio transceiver; and
control circuitry configured to:
control the radio transceiver to receive Channel Occupancy Time (COT) information on Physical Uplink Shared Channel (PUSCH) from a user equipment, wherein
the COT information is information to share a COT between the base station device and the user equipment, and
the COT information indicates each of:
first information that indicates a start timing for the base station device to start the share of the COT,
second information that indicates a length of the COT during which the base station device is able to share the COT, and
third information that indicates a channel access priority class; and
control, based on the COT information, the radio transceiver to transmit a signal.

2. The base station device according to claim 1, wherein the control circuitry is further configured to execute, based on the COT information, channel access without execution of carrier sensing.

3. The base station device according to claim 2, wherein the first information further indicates a number of slots, and
the control circuitry is further configured to:
add the number of slots to a slot number at which the COT information is received; and
recognize a remaining duration of the COT based on the added number of slots.

4. A user equipment, comprising:
control circuitry configured to:
control a radio transceiver of the user equipment to transmit Channel Occupancy Time (COT) information on Physical Uplink Shared Channel (PUSCH) to a base station device, wherein
the COT information is information to share a COT between the base station device and the user equipment, and
the COT information indicates each of:
first information that indicates a start timing for the base station device to start the share of the COT,
second information that indicates a length of the COT during which the base station device is able to share the COT, and
third information that indicates a channel access priority class; and
control the radio transceiver to receive a signal from the base station device, wherein the control of the radio transceiver is based on the COT information.

5. The user equipment according to claim 4, wherein the base station device executes, based on the COT information, channel access without execution of carrier sensing.

6. The user equipment according to claim 5, wherein the first information further indicates a number of slots, and
the base station device further:
adds the number of slots to a slot number at which the COT information is transmitted; and
recognizes a remaining duration of the COT based on the added number of slots.

7. A non-transitory computer-readable medium having stored thereon, computer-executable instructions which, when executed by a control circuitry of a user equipment, cause the control circuitry to execute operations, the operations comprising:
controlling a radio transceiver of the user equipment to transmit Channel Occupancy Time (COT) information on Physical Uplink Shared Channel (PUSCH) to a base station device, wherein
the COT information is information to share a COT between the base station device and the user equipment, and
the COT information indicates each of:
first information that indicates a start timing for the base station device to start the share of the COT,
second information that indicates a length of the COT during which the base station device is able to share the COT, and
third information that indicates a channel access priority class; and
controlling the radio transceiver to receive a signal from the base station device, wherein the control of the radio transceiver is based on the COT information.

8. The non-transitory computer-readable medium according to claim 7, wherein the base station device executes, based on the COT information, channel access without execution of carrier sensing.

9. The non-transitory computer-readable medium according to claim 8, wherein
the first information further indicates a number of slots, and
the base station device further:
adds the number of slots to a slot number at which the COT information is transmitted; and
recognizes a remaining duration of the COT based on the added number of slots.

10. A method, comprising:
in a base station device:
controlling a radio transceiver of the base station device to receive Channel Occupancy Time (COT) information on Physical Uplink Shared Channel (PUSCH) from a user equipment, wherein
the COT information is information to share a COT between the base station device and the user equipment, and
the COT information indicates each of:
first information that indicates a start timing for the base station device to start the share of the COT,
second information that indicates a length of the COT during which the base station device is able to share the COT, and
third information that indicates a channel access priority class; and
controlling, based on the COT information, the radio transceiver to transmit a signal.

11. The method according to claim 10, further comprising executing, based on the COT information, channel access without execution of carrier sensing.

12. The method according to claim 11, wherein
the first information further indicates a number of slots, the method further comprises:
adding the number of slots to a slot number at which the COT information is received; and
recognizing a remaining duration of the COT based on the added number of slots.

13. A method, comprising:
in a user equipment:
controlling a radio transceiver of the user equipment to transmit Channel Occupancy Time (COT) information on Physical Uplink Shared Channel (PUSCH) to a base station device, wherein
the COT information is information to share a COT between the base station device and the user equipment, and
the COT information indicates each of:
first information that indicates a start timing for the base station device to start the share of the COT,
second information that indicates a length of the COT during which the base station device is able to share the COT, and
third information that indicates a channel access priority class; and
controlling the radio transceiver to receive a signal from the base station device, wherein the control of the radio transceiver is based on the COT information.

14. The method according to claim 13, wherein the base station device executes, based on the COT information, channel access without execution of carrier sensing.

15. The method according to claim 14, wherein
the first information further indicates a number of slots, and
the base station device further:
adds the number of slots to a slot number at which the COT information is transmitted; and
recognizes a remaining duration of the COT based on the added number of slots.

* * * * *